United States Patent
Slocum et al.

(10) Patent No.: US 11,130,557 B1
(45) Date of Patent: Sep. 28, 2021

(54) CONTROLLING LIFTING GAS IN INFLATABLE STRUCTURES

(71) Applicant: LTAG SYSTEMS LLC, Bow, NH (US)

(72) Inventors: Alexander H. Slocum, Bow, NH (US); Jonathan T. Slocum, Bow, NH (US)

(73) Assignee: LTAG SYSTEMS LLC, Bow, NH (US)

( * ) Notice: Subject to any disclaimer, the term of this patent is extended or adjusted under 35 U.S.C. 154(b) by 0 days.

(21) Appl. No.: 17/014,593

(22) Filed: Sep. 8, 2020

Related U.S. Application Data

(60) Provisional application No. 62/897,349, filed on Sep. 8, 2019.

(51) Int. Cl.
| | |
|---|---|
| *B64B 1/40* | (2006.01) |
| *B64B 1/62* | (2006.01) |
| *B64B 1/70* | (2006.01) |
| *B64B 1/64* | (2006.01) |

(52) U.S. Cl.
CPC ............ *B64B 1/62* (2013.01); *B64B 1/40* (2013.01); *B64B 1/64* (2013.01); *B64B 1/70* (2013.01)

(58) Field of Classification Search
CPC .... B64B 1/40; B64B 1/62; B64B 1/64; B64B 1/70
See application file for complete search history.

(56) References Cited

U.S. PATENT DOCUMENTS 3,204,320 A  9/1965 Eckstein et al.
3,993,595 A  11/1976 Merkl
4,358,291 A  11/1982 Cuomo et al.
(Continued)

FOREIGN PATENT DOCUMENTS

| WO | 2015005921 A1 | 1/2015 |
| WO | 20150077225 A1 | 5/2015 |
| WO | 2016196718 A1 | 12/2016 |

OTHER PUBLICATIONS

Metals Handbook Tenth Edition, "vol. 2, Properties and Selection: Nonferrous Alloys and Special-Purpose Materials", Oct. 1990, pp. 145-146.
Rajagopalan, M. et al., "Atomic-scale analysis of liquid-gallium embrittlement of aluminum grain boundaries", Acta Materialia, vol. 73 Jul. 2014, pp. 312-325.
Choi, Go et al., "Mechanism of Hydogen Generation via Water Reaction with Aluminum Alloys", Generating hydrogen on demand Jun. 28, 2010, 4 pages.
(Continued)

*Primary Examiner* — Philip J Bonzell
*Assistant Examiner* — Tye William Abell
(74) *Attorney, Agent, or Firm* — The Marbury Law Group, PLLC

(57) ABSTRACT

Devices, systems, and methods are directed to controlling lifting gas in a volume defined by an inflatable structure of an aircraft. For example, controlling lifting gas in the volume of the inflatable structure may account for variations in ambient and tactical conditions experienced by the aircraft over the course of flight, as may be useful for lifting the aircraft to a target altitude and/or carrying out a particular mission. Additionally, or alternatively, controlling lifting gas in the volume of the inflatable structure may facilitate lifting the aircraft using lifting gas generated by reacting stable materials with one another at a launch site in the field. As an example, aluminum may react with water to form a lifting gas including hydrogen and steam. As the steam condenses to water in the inflatable structure, a valve may expel water from the inflatable structure to assist in maintaining buoyancy of the aircraft.

14 Claims, 11 Drawing Sheets

(56) References Cited

U.S. PATENT DOCUMENTS

| | | | |
|---|---|---|---|
| 4,770,848 | A | 9/1988 | Ghosh et al. |
| 5,620,652 | A | 4/1997 | Tack et al. |
| 6,648,272 | B1* | 11/2003 | Kothmann ............... B64B 1/005 244/30 |
| 8,418,435 | B2 | 4/2013 | Hatoum |
| 10,745,789 | B2 | 8/2020 | Slocum |
| 2003/0024323 | A1 | 2/2003 | Wang et al. |
| 2003/0062444 | A1* | 4/2003 | Goodey .................... B64B 1/00 244/24 |
| 2007/0057116 | A1* | 3/2007 | Sinsabaugh ............... B64B 1/62 244/96 |
| 2010/0028255 | A1 | 2/2010 | Hatoum |
| 2012/0052001 | A1 | 3/2012 | Woodall et al. |
| 2016/0355918 | A1 | 12/2016 | Slocum |
| 2019/0077510 | A1* | 3/2019 | Panas ........................ B68B 1/16 |
| 2019/0341637 | A1 | 11/2019 | Fine et al. |
| 2020/0199728 | A1 | 6/2020 | Slocum |
| 2020/0262536 | A1* | 8/2020 | Deakin ..................... B64B 1/38 |

OTHER PUBLICATIONS

Parmuzina, A.V. et al., "Oxidation of activated aluminum with water as a method for hydogen generation", Russian Chemical Bulletin, International Edition, vol. 58, No. 3 Mar. 2009, pp. 493-989.

Vitos, L. et al., "The Surface Energy of Metals", Elsevier Surface Science 411, 1998, pp. 186-202.

"Fundamentals of Adhesion edited by Lieng-Huang Lee", Xerox Corporation, 1991, pp. 333-336.

Ansara, I. et al., "Thermodynamic Analysis of the Ga—In, Al—Ga, Al—In and the Al—Ga—In Systems", Calphad vol. 2, No. 3 1978, pp. 187-196.

EPO, "EP Application Serial No. 16804381.8, Extended European Search Report dated Oct. 26, 2018", 7 pages.

WIPO, "PCT Application No. PCT/US16/35397, International Preliminary Report on Patentability dated Dec. 5, 2017", 11 pages.

ISA, "PCT Application No. PCT/US16/35397, International Search Report and Written Opinion dated Sep. 7, 2016", 13 pages.

USPTO, U.S. Appl. No. 16/804,676, Non-Final Office Action dated Jul. 2021, 17 pages.

* cited by examiner

CONTROLLING LIFTING GAS IN INFLATABLE STRUCTURES

CROSS-REFERENCE TO RELATED APPLICATIONS

This application claims the benefit of priority of U.S. Provisional Patent Application No. 62/897,349, filed on Sep. 8, 2019, the entire contents of which are incorporated herein by reference.

BACKGROUND

Inflatable aircraft can be filled with a lifting gas such that the average density of the inflatable aircraft is less than that of ambient air around the aircraft. The resulting buoyancy allows the inflatable aircraft to rise or float in the ambient air, making it useful in a variety of dirigible and non-dirigible applications. When desirable, the buoyancy of the aircraft can become neutrally buoyant to allow the aircraft to hover. As an example, inflatable aircraft in the form of weather balloons are commonly used for meteorological observation of localized conditions that may not be accurately measurable using ground-based measurements or satellite images.

While lifting gas is a reliable way to impart at least a degree of buoyancy to an inflatable aircraft, the composition of the lifting gas can limit the effectiveness—or even the viability—of the inflatable aircraft for a particular mission. For example, helium is inert and has low density relative to air (and, thus, high lifting capacity). As a non-renewable resource, however, helium is subject to price spikes resulting from shortages and must be stored and transported in compressed gas cylinders. Thus, helium presents logistical challenges for launching inflatable aircraft from remote or poorly resourced locations. Helium is also a critical inert gas for the semi-conductor industry, and thus is not capable of sustaining a balloon market that is growing. As another example, hydrogen offers about eight percent more lift than helium and can be cost-effectively formed on a commercial scale using a variety of techniques, including from renewable resources. Given its wide flammability limits in the presence of air, however, hydrogen is dangerous to store and transport, thus presenting safety challenges for transport and use in uncontrolled environments.

Accordingly, there remains a need for controlling lifting gas to achieve robust performance of inflatable aircraft over a wide range of environmental conditions while using resources compatible with field deployment.

SUMMARY

Devices, systems, and methods are directed to controlling lifting gas in a volume defined by an inflatable structure of an aircraft. For example, controlling lifting gas in the volume of the inflatable structure may account for variations in ambient and tactical conditions experienced by the aircraft over the course of flight, as may be useful for lifting the aircraft to a target altitude and/or carrying out a particular mission. Additionally, or alternatively, controlling lifting gas in the volume of the inflatable structure may facilitate lifting the aircraft using lifting gas generated by reacting stable materials with one another at a launch site in the field. As an example, aluminum may react with water to form a lifting gas including hydrogen and steam. The steam can give the aircraft additional lift from the ground, thus reducing the total amount of hydrogen gas needed to keep the aircraft afloat at higher altitudes. As the steam condenses to water in the inflatable structure, a valve may expel water from the inflatable structure to assist in maintaining buoyancy of the aircraft.

According to one aspect, an aircraft system may include an inflatable structure defining a volume configured to receive a lifting gas, and a drain valve coupled to the inflatable structure and disposed relative to the volume to collect condensate, in the volume, from the lifting gas received into the volume, the drain valve controllable to expel the condensate from the volume while maintaining a substantially gas-tight seal between the volume and an environment outside of the volume.

In some implementations, the inflatable structure may include a balloon at least partially defining the volume, and the balloon is formed of one or more of a compliant material or a semi-compliant material.

In certain implementations, the drain valve may be disposed relative to the volume of the inflatable structure in an orientation in which the condensate in the volume is movable toward the drain valve under gravitational force. Additionally, or alternatively, the drain valve may include a float valve. Further, or instead, the inflatable structure may further include a ballast section disposed relative to the drain valve in an orientation in which the condensate in the volume collects in the ballast section as the condensate moves toward the drain valve under gravitational force. The drain valve may be controllable to retain a predetermined amount of condensate in the ballast section to ballast the inflatable structure and expel an excess amount of condensate from the volume while maintaining a substantially gas-tight seal between the volume and the environment outside of the volume.

In some implementations, the aircraft system may further include a reactor defining a chamber, an inlet region, and an outlet region. The inlet region and the outlet region may be, for example, in fluid communication with one another and with the chamber. Additionally, or alternatively, the inlet region may be releasably securable in fluid communication with a fluid source, and the lifting gas may be receivable into the volume via fluid communication between the volume of the inflatable structure and the outlet region of the reactor. In some instances, at least a portion of the reactor may be mechanically securable to the inflatable structure to be movable with the inflatable structure during flight. Additionally, or alternatively, the aircraft system may include a condenser and a container in fluid communication with each other. For example, the container may be in fluid communication with the chamber of the reactor. Additionally, or alternatively, the condenser may be configured to return at least some of the fluid from the condenser to the container while the inflatable structure is in fluid communication with the outlet region of the reactor. Further, or instead, the aircraft system may include a first heat exchanger in thermal communication with the condenser. Still further, or instead, the aircraft system may include a second heat exchanger in thermal communication with the chamber of the reactor. Yet further, or instead, the aircraft system may further include a swirl separator arranged to separate at least one heavier component from at least one lighter component in a flow of lifting gas from the outlet region of the reactor and direct the remaining lifting gas from the swirl separator toward the volume of the inflatable structure. Additionally, or alternatively, the aircraft system may include an auxiliary gas source in fluid communication with the volume of the inflatable structure to mix an auxiliary gas from the auxiliary gas source with the lifting gas receivable into the volume from the outlet region of the reactor. For example, a flow rate of the auxiliary gas from the auxiliary gas source may be adjustable to control a ratio of the auxiliary gas to the lifting gas receivable into the volume of the inflatable structure.

According to another aspect, a computer program product may be encoded on one or more non-transitory computer storage media, the computer program product comprising instructions that, when executed by one or more computing devices, may cause the one or more computing devices to perform operations including receiving input including a target altitude for an aircraft including an inflatable structure defining a volume, based on the input, determining a target density of a lifting gas in the volume according to a model stored on the one or more non-transitory computer storage media, receiving, from a temperature sensor, a first signal indicative of temperature of the lifting gas in the volume, receiving, from a pressure sensor, a second signal indicative of pressure of the lifting gas in the volume, based on the first signal, the second signal, and the target density, controlling a flow of the lifting gas into the volume from a source in fluid communication with the volume. As an example, the input may include atmospheric conditions at a launch location, the target altitude, or a combination thereof.

In certain implementations, the instructions, when executed by one or more computing devices, may cause the one or more computing devices to perform the further operations of receiving, from a motion sensor, a third signal indicative of movement of the inflatable structure and, based on the third signal, selectively controlling actuation of a drain valve in fluid communication with the volume of the inflatable structure such that moisture condensed in the volume is selectively released from the inflatable structure to ballast the inflatable structure.

According to still another aspect, an aircraft may include an inflatable structure defining a volume, a nozzle defining an exit, the nozzle in fluid communication with the volume, an igniter in a vicinity of the exit of the nozzle, and a payload coupled to the inflatable structure. The payload may include a strategic portion and a controller. As an example, the strategic portion of the payload may be at least partially exposed to an environment outside of the volume. Additionally, or alternatively, the controller may be configured to actuate the nozzle to issue a lifting gas from the volume in a direction from the exit toward at least the strategic portion of the payload, and to actuate the igniter to ignite a combustible mixture including the lifting gas directed from the exit of the nozzle toward one or more of the inflatable structure or the strategic portion of the payload.

In certain implementations, the nozzle may include a mixing section in fluid communication with the exit of the nozzle. The mixing section may, for example, define at least one orifice through which air in the environment is movable into the mixing section to mix with the lifting gas from the volume upon actuation of the nozzle.

In some implementations, the payload may, additionally or alternatively, include a sensor, and the controller the controller may be configured to receive a signal from the sensor and to actuate at least one of the nozzle or the igniter based on the signal from the sensor. Examples of the sensor include, but are not limited to, one or more of an altimeter, a thermocouple, a timer, a global positioning system receiver, or a wireless communication receiver.

In certain implementations, the payload may further, or instead, include a transmitter, and the controller may be configured, based on the signal from the sensor, to activate the transmitter to transmit data from the strategic portion of the payload to a remote entity.

BRIEF DESCRIPTION OF THE FIGURES

Like reference symbols in the various drawings indicate like elements.

DETAILED DESCRIPTION

Figure 1A:
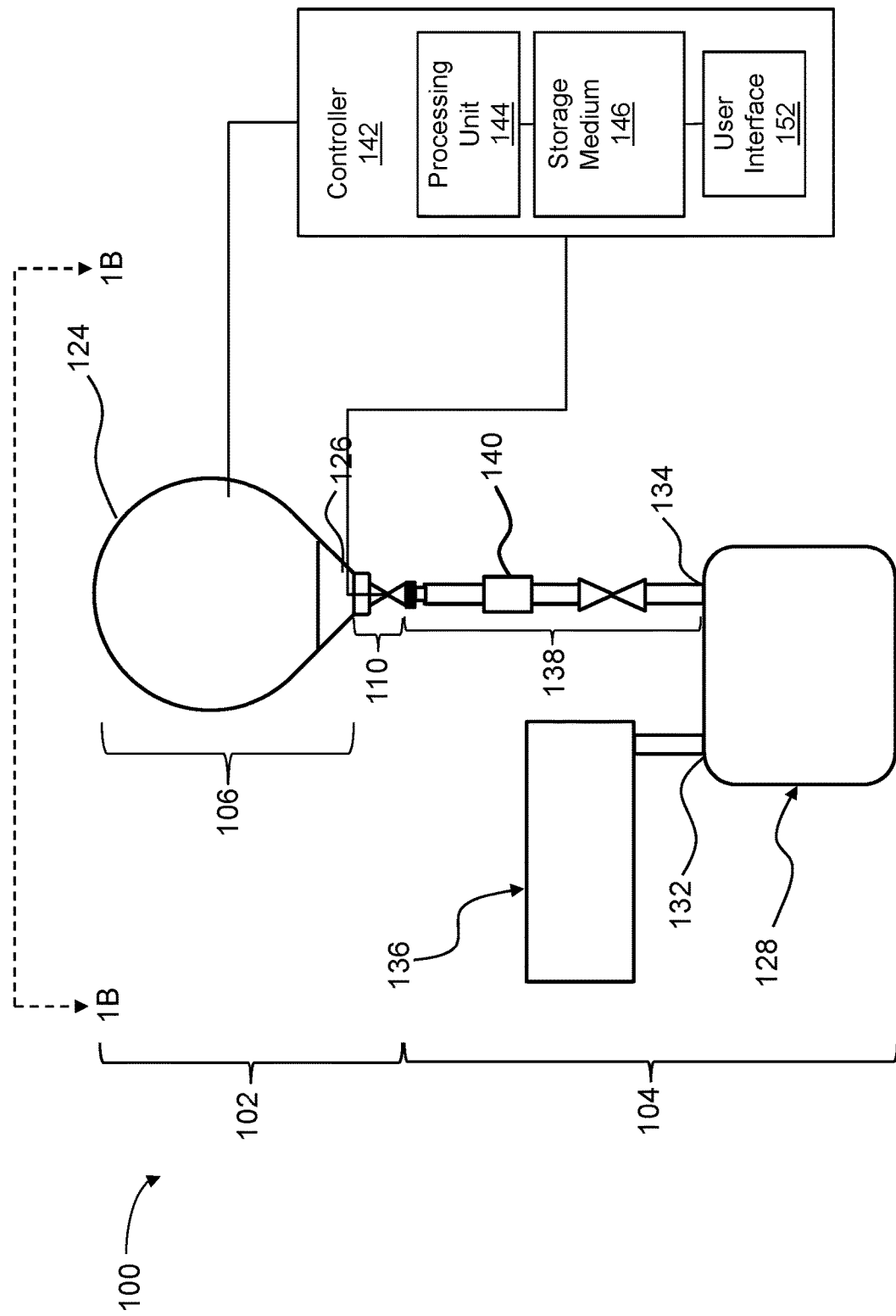
FIG. 1A is a schematic representation of an aircraft system including an aircraft and a delivery system, with the aircraft shown coupled to the delivery system to receive lifting gas from the delivery system.
Figure 1B:
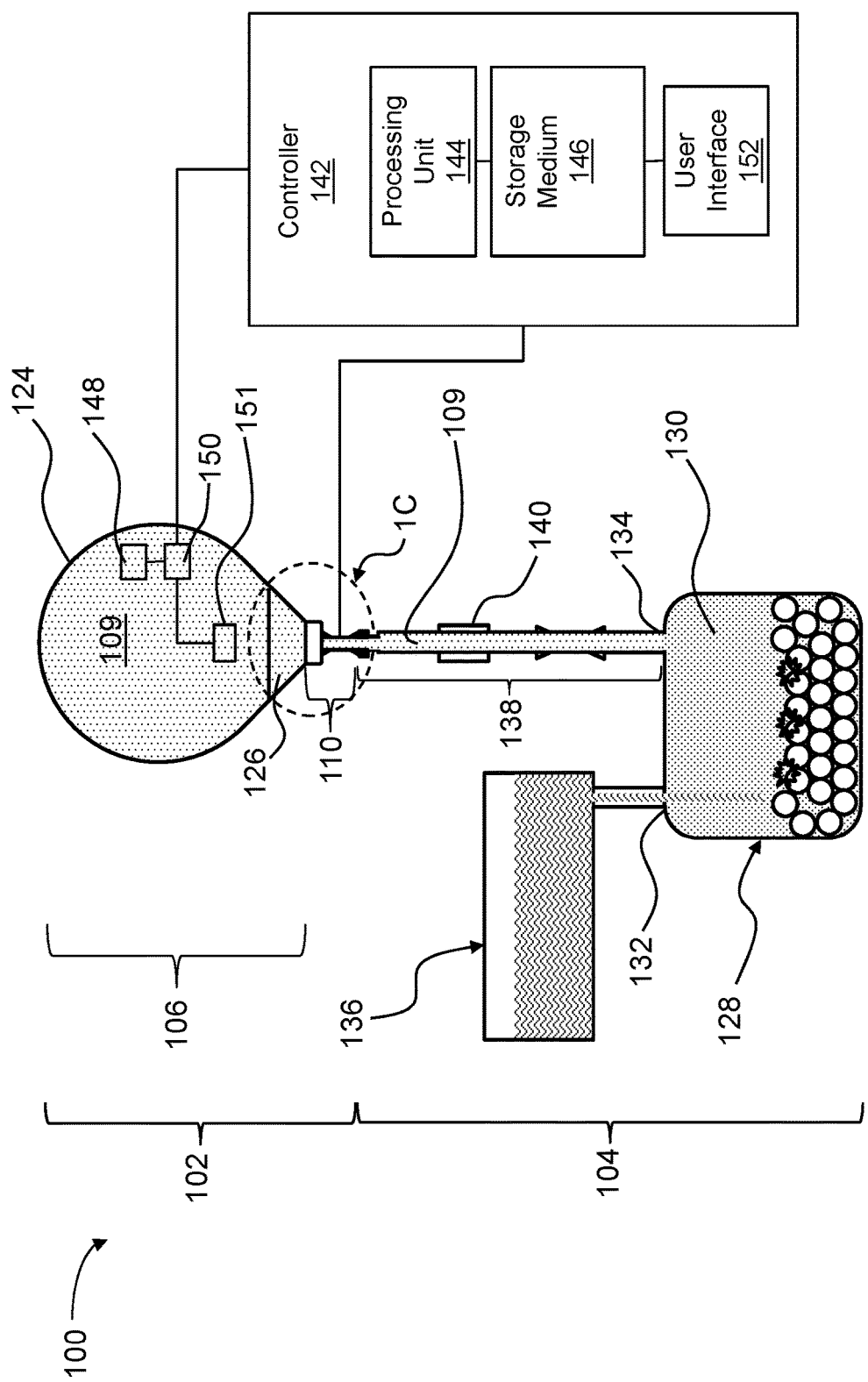
FIG. 1B is a cross-sectional side view of an inflatable structure of the aircraft of FIG. 1A, the cross-section taken along the line 1B-1B in FIG. 1A.
Figure 1C:
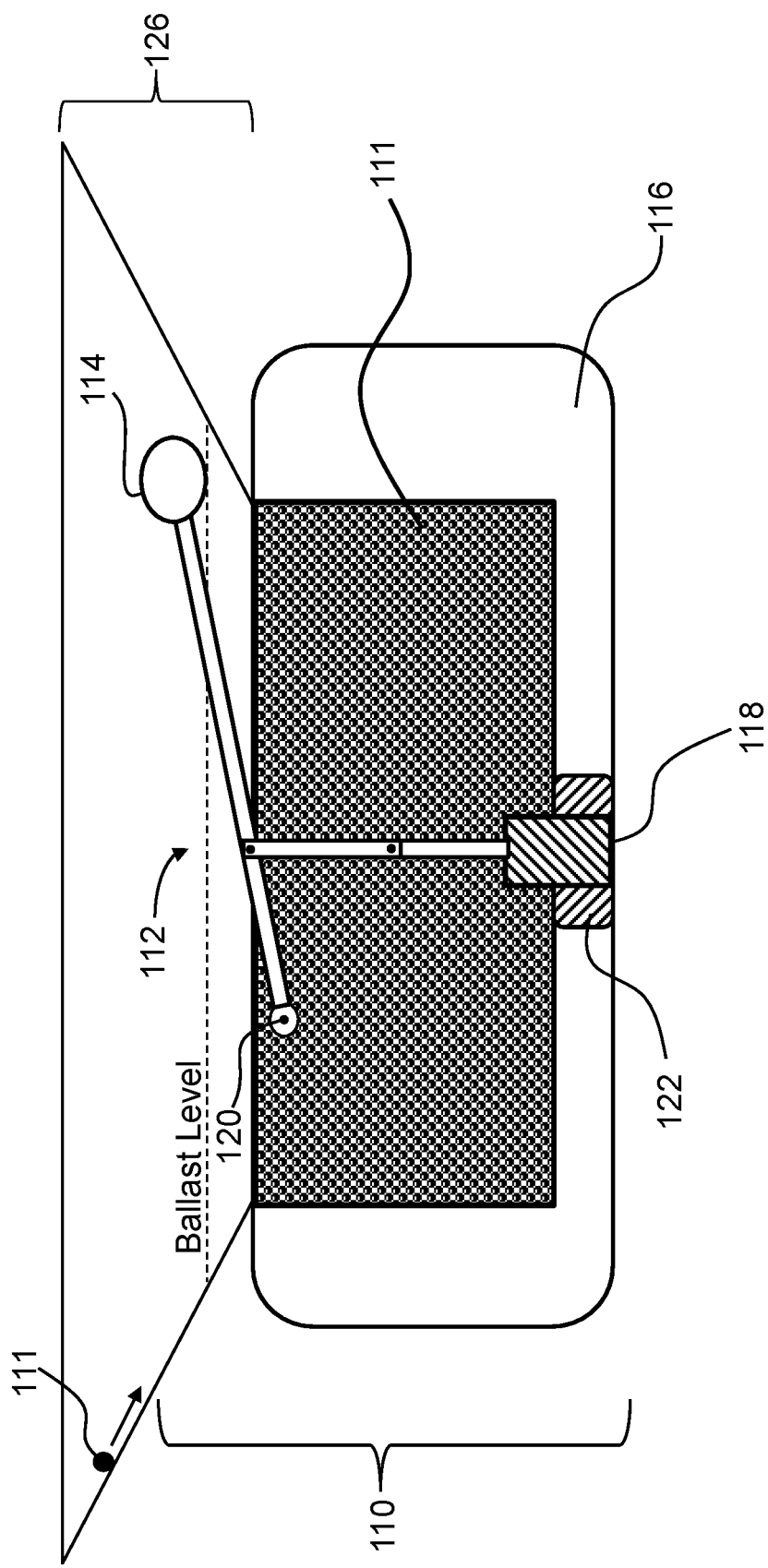
FIG. 1C is a cross-sectional side view a drain valve of the aircraft of FIG. 1A, shown along the area of detail 1C in FIG. 1B.
Figure 1D:
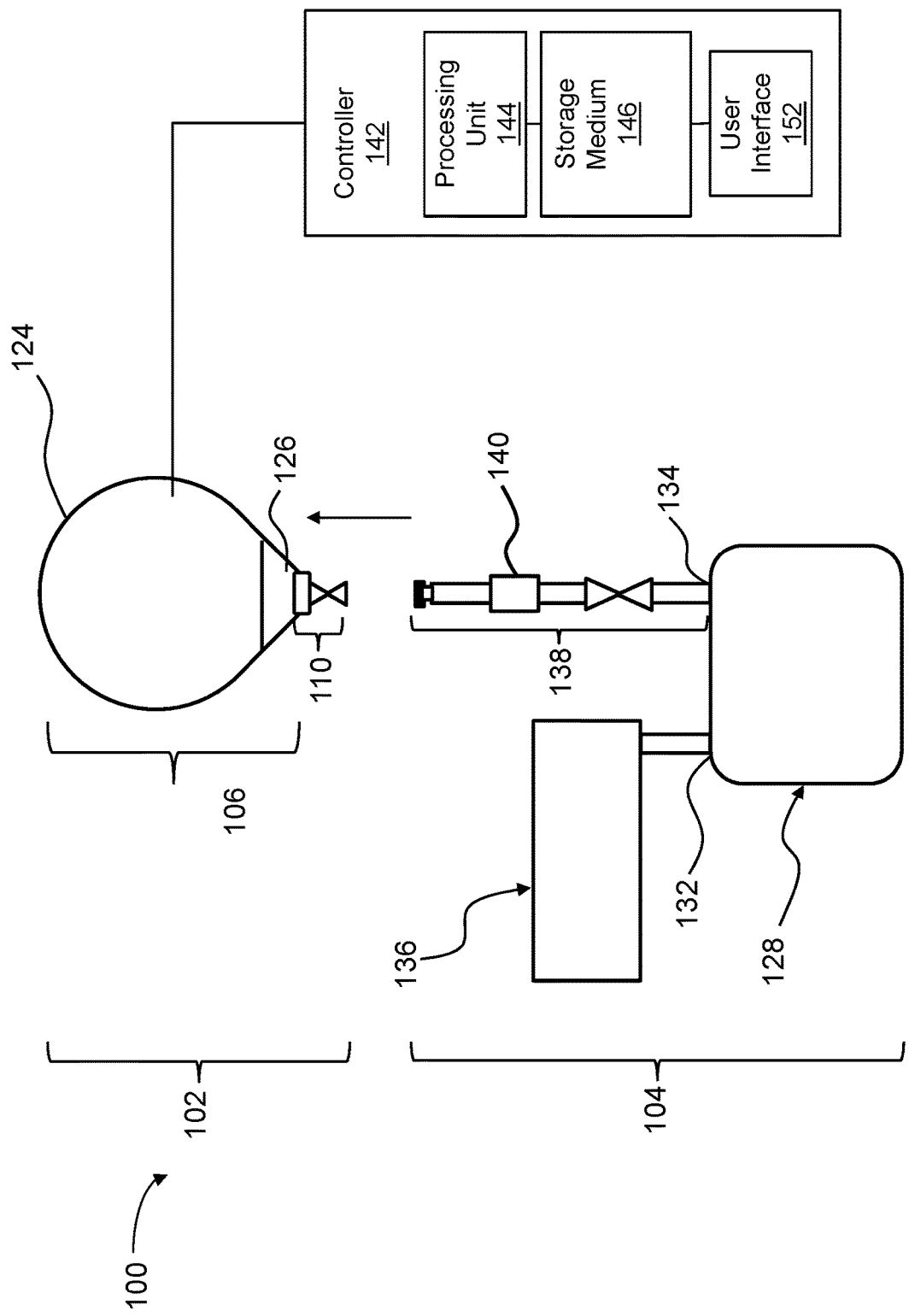
FIG. 1D is a schematic representation of the aircraft system of FIG. 1A, with the aircraft shown decoupled from the delivery system.

The embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

In the description that follows, of aircraft of various implementations of devices, systems, and methods are generally described with respect to balloons, given that balloons are an important application for lifting gas and serve as useful examples for highlighting particular aspects of the devices, systems, and methods of the present disclosure. That is, it shall be understood that, to the extent aircraft are described herein as including aspects of balloons, this is for the sake of clear and efficient description and should not be considered limiting. Thus, unless otherwise specified or made clear from the context, the term "aircraft" shall be understood to include any manner and form of object that can receive lifting gas to have at least some degree of buoyancy in ambient air, whether in an indoor or an outdoor environment. In use, such aircraft may be used to make observations (e.g., about weather in the atmosphere, conditions of terrain below the aircraft), carry passengers and/or cargo, broadcast and/or receive signals beyond the aircraft, collect data, lift structures, or serve as decorations. Accordingly, as used herein, aircraft may include any one or more of various different manned or unmanned craft, dirigible or non-dirigible craft, independently propelled or floating craft, rigid or nonrigid craft, tethered or untethered craft, or combinations thereof. Some examples of aircraft, therefore, may include, but are not limited to any manner and form of aerostats, balloons, or other rigid, semi-rigid, or non-rigid inflatable structures.

As used herein, the term "gas" or variants thereof (e.g., lifting gas) shall be understood to include a single component or multiple components (mixed), unless otherwise specified or made clear from the context. Further, unless a contrary intent is indicated, the use of the term gas shall be generally understood to include any multi-phase mixture that includes one or more gas phase components and exhibits characteristics of a compressible fluid, with a relationship between pressure, volume, and temperature that is accurately characterized by the ideal gas law to within about ±5 percent at room temperature at sea level. Thus, for example, a gas may include at least one gas phase component, as well as some amount of one or more vapor components (e.g., water vapor).

As also used herein, unless otherwise specified or made clear from the context, the term "lift capacity" shall be understood to be interchangeable with buoyancy with respect to air and is express as follows:

$$F_B = (\rho_{air} - \rho_{gas}) * g * V \quad [\text{Eq. 1}]$$

where $F_B$ is buoyancy force, $\rho_{air}$ is the density of air in the environment outside of the aircraft, $\rho_{gas}$ is the density of the lifting gas in the aircraft, g is the force of gravity, and V is the volume of air displaced by the lifting gas. That is, lift capacity shall be understood to be the force available for the lifting gas to impart to the aircraft at any given point in time. Accordingly, as may be readily appreciated, in instances in which the lift capacity of the lifting gas carried in an aircraft is greater than the weight of the aircraft (including the lifting gas and payload), the aircraft will ascend. Similarly, in instances in which the lift capacity of the lifting gas carried in the aircraft is less than the weight of the aircraft (including the lifting gas and payload), the aircraft will descend.

Referring now to FIGS. 1A-1D, an aircraft system 100 may include an aircraft 102 and a delivery system 104 releasably securable in fluid communication with one another. In general, the aircraft 102 may include an inflatable structure 106 defining a volume 108. In use, as described in greater detail below, the delivery system 104 may form a lifting gas 109 received into the volume 108 in an amount sufficient to impart the aircraft 102 with an average density less than that of air in the environment outside of the volume 108 (e.g., such that the aircraft 102 has a predetermined amount of buoyancy), and the aircraft 102 may then be decoupled from the delivery system 104 to carry out a particular mission. As also described in greater detail below, the lifting gas 109 formed by the delivery system 104 may include a mixture of hydrogen and steam, each of which is useful for imparting buoyancy to the aircraft 102 under appropriate atmospheric conditions. However, as atmospheric conditions change about the aircraft 102 (e.g., decreasing pressure and temperature as the aircraft 102 floats to increasing altitude, heat transfer to the environment, or a combination thereof), at least a portion of the steam in the lifting gas 109 in the volume 108 may condense to form a condensate 111 in the volume 108. The condensate 111 may be, for example, water condensed from steam in the volume 108, any byproduct of a reaction carried out in the delivery system 104 and condensed in the volume 108, or a combination thereof. As compared to steam, which provides lift, the condensate 111 in the volume 108 does not provide lift and, thus, the weight of the condensate 111 counteracts buoyancy forces provided by the hydrogen and any remaining steam in the lifting gas 109. Thus, the aircraft 102 may additionally, or alternatively, include a drain valve 110 coupled to the inflatable structure 106 and disposed relative to the volume 108 to collect moisture condensed in the volume 108 from the lifting gas 109 received into the volume 108 from the delivery system 104. As also described in greater detail below, the drain valve 110 may be controllable to expel the condensate 111 from the volume 108 to facilitate making efficient use of the buoyancy force provided by the lifting gas 109 remaining the volume 108. That is, draining at least a portion of the condensate 111 from the volume 108 via the drain valve 110 may facilitate achieving higher altitudes as compared to similarly sized aircraft under otherwise identical conditions.

In general, the drain valve 110 may be disposed relative to the volume 108 defined by the inflatable structure 106 in any one or more of various different orientations suitable for achieving fluid communication between the drain valve 110 and the volume 108. Thus, in certain implementations, the drain valve 110 may be at least partially disposed within the inflatable structure 106. Such positioning of the drain valve 110 may useful for, among other things, achieving low volumes of the condensate 111 required to actuate the drain valve 110, reducing the likelihood of damage to the drain valve 110 during flight, and reducing the amount of heat lost from the volume 108 to the environment, via the drain valve 110. In some implementations, however, the drain valve 110 may be mechanically coupled to the outside of the inflatable structure 106 and, thus, outside of the volume 108, as may be useful for facilitating repairing and/or replacing the drain valve 110 in the field.

Additionally, or alternatively, whether the drain valve 110 is at least partially disposed within or outside of the inflatable structure 106, the drain valve 110 may be disposed relative to the volume 108 of the inflatable structure 106 such that the condensate 111 condensed in the volume 108 is movable toward the drain valve 110 by gravitational force. As may be appreciated, movement of the condensate 111 toward the drain valve 110 under gravitational force may be particularly advantageous for achieving lightweight construction of the aircraft 102, as compared to the use of a pump or other mechanical equipment that adds weight to the aircraft 102. Further, or instead, orienting the drain valve 110 to receive the condensate 111 through gravitational force may facilitate achieving robust performance of the aircraft 102. For example, as compared to the use of pumps, the use of relative orientation of the drain valve 110 to the volume 108 to move the condensate 111 to the drain valve 110 may have fewer failure modes and/or may be more resilient to changing or unpredictable conditions encountered by the aircraft 102 while in flight. To the extent a reaction byproduct in solid or liquid form is carried into the volume 108, it shall be appreciated that the condensate 111 formed in the volume 108 may mix with the solid or liquid byproduct and, thus, carry the solid or liquid byproduct out of the volume 108 through the drain valve 110, reducing the weight of the aircraft 102. Thus, unless otherwise specified or made clear from the context, any description of condensate 111 herein shall be understood to include any condensate formed in the volume, as well as material that may flow along with the condensate.

In general, the drain valve 110 may be controllable to expel the condensate 111 from the volume 108 of the inflatable structure 106 while maintaining a substantially gas-tight seal between the volume 108 and an environment (e.g., ambient environment) outside of the volume 108. As used in this context, a substantially gas-tight seal shall be understood to be any seal that results in less than about 1 percent of the volume of the lifting gas 109 escaping from the volume 108 via the drain valve 110. That is, importantly, the drain valve 110 may remove weight—in the form of the condensate 111 being expelled—from the volume 108 with little or no resulting impact on the lift capacity provided by the lifting gas 109 in the volume 108, even as the drain valve 110 moves from a closed position to an open position and back to the closed position to expel the moisture. In doing so, it shall be understood that the drain valve 110 may improve the overall lift performance of the aircraft 102 during the course of flight, as compared to the lift performance of the aircraft 102 immediately prior to expelling the condensate 111 from the volume 108 of the inflatable structure 106. In certain instances, condensation of the condensate 111 from the lifting gas 109 in the volume 108 may be the result of unexpected conditions encountered by the aircraft 102 and, thus, action of the drain valve 110 to expel the condensate 111 from the volume 108 may facilitate making the aircraft 102 more robust with respect to achieving target altitudes. Further, or instead, the drain valve 110 may facilitate achieving target altitudes using a range of compositions of the lifting gas 109—thus, for example, reducing the need for tight control over composition of the lifting gas 109 and facilitating production of the lifting gas 109 at the launch site, using a combination of portable and locally available resources, as described in greater detail below.

In certain implementations, returning to the example of the drain valve 110 receiving the condensate 111 via gravitational force, the drain valve 110 may include a float valve 112 having a ball float 114, a body 116, and a piston 118. The ball float 114 may be coupled to the body 116 at a hinge 120, with the ball float 114 pivotable about the hinge 120 in response to changes in a level of the condensate 111 rises in the volume 108. The hinge 120 may be mechanically coupled to the piston 118, and the pivoting movement of the ball float 114 about the hinge 120 may move the piston 118 up and down within the body 116. For example, in the orientation shown in the figures, as the ball float 114 moves upward in response to an increase in a level of the condensate 111 in the volume 108, the hinge 120 may rotate counterclockwise to move the piston 118 away from a seat 122, thus allowing some of the condensate 111 to be expelled from the volume 108 as is desirable for achieving efficient use of the lift capacity of the lifting gas 109 remaining in the volume 108. As some of the condensate 111 is expelled from the volume 108 and the level of the moisture remaining in the volume 108 decreases, the ball float 114 may move downward such that the hinge 120 may rotate clockwise to move the piston 118 into engagement with the seat 122, thus closing the float valve 112.

Importantly, as may be appreciated from the foregoing description, the float valve 112 may be particularly effective in maintaining a substantially gas-tight seal between the volume 108 and an environment outside of the volume 108 as the float valve 112 is open and closed to drain some of the condensate 111 from the volume 108. That is, throughout operation of the float valve 112 at least some of the condensate 111 may remain between the lifting gas 109 in the volume 108 and the environment outside of the volume 108 when the piston 118 is moved away from the seat 122. Stated differently, by allowing some of the condensate 111 to remain in the volume 108 between the lifting gas 109 and the seat 122 as the float valve 112 is open and closed, the float valve 112 may be controllable to remove some of the condensate 111 from the volume 108 while the condensate 111 remaining in and/or around the float valve 112 itself maintains the substantially gas-tight seal between the volume 108 and the environment outside of the volume 108.

While a specific configuration of the float valve 112 has been described, it shall be understood that this is for the purpose of clear and efficient description of certain aspects of float valve operation in the context of controlling moisture in the inflatable structure 106. Thus, more generally, it shall be understood the float valve 112 may be any one or more of various different mechanical valves controllable by a float element responsive to a change in level of the condensate 111 to open and close the float valve 112 to expel some of the condensate 111 from the volume 108 while the remainder of the condensate 111 may facilitate maintaining the substantially gas-tight seal between the volume 108 and the environment outside of the volume 108 throughout operation of the float valve 112. As may be appreciated, the mechanical and self-controlling nature of the float valve 112 may be robust over a range of conditions both inside and outside of the volume 108 during inflation of the inflatable structure 106 and/or during flight of the aircraft 102 while being lightweight and inexpensive, as compared to valves based on electronic sensing, actuation, or a combination thereof. Further, or instead, as described in greater detail below, the mechanical and robust nature of the float valve 112 suitable for withstanding the lifting gas 109 may facilitate delivering the lifting gas 109 into the volume 108 of the inflatable structure 106. By eliminating the need separate sites of ingress into and egress out of the inflatable structure 106, the float valve 112 serving to both fill and empty the volume 108 of the inflatable structure may reduce the number of potential sources of inadvertent leakage out of the volume 108, thus improving overall integrity of the aircraft 102. While electronic sensing, actuation, or a combination thereof may have limited usefulness in certain implementations of the drain valve 110, as described above, it shall be appreciated that such electronic sensing, actuation, or a combination thereof may be useful in the drain valve 110 in instances benefiting from sophisticated control (e.g., on-demand) over expulsion of the condensate 111 from the volume 108.

In general, the inflatable structure 106 may be formed according to any one or more of various different form factors suitable for a particular use case of the aircraft 102. That is, stated in terms of buoyancy, the inflatable structure 106 may be formed of any one or more of various different materials and according to any one or more of various different shapes, provided that the volume 108 defined by the inflatable structure 106 is sized to receive a suitable volume of a predetermined lifting gas having a lifting capacity (buoyancy force per unit volume) appropriate for lifting the weight of the aircraft 102 (including any payload intended to be carried by the aircraft 102) to a target altitude. In certain instances, the form factor of the inflatable structure 106 may be additionally, or alternatively, constrained based on logistical considerations, such as those associated with storing the aircraft 102 and/or the type of transport available to move the aircraft 102 to a launch site.

As an example, given the trade-off between weight and overall size of the inflatable structure 106, implementations of the inflatable structure 106 for observation missions may be formed of any combination of materials that collectively facilitate floating the aircraft 102 to a target altitude (e.g., between about 1 km and about 30 km) while maintaining the overall size of the aircraft 102, in an uninflated state, within a size and weight envelope amenable to portability by passenger vehicle or, in some case, by an individual. Additionally, or alternatively, the material forming the inflatable structure 106, at least along the volume 108, may be substantially impermeable to diffusion of the lifting gas 109 through the material defining the inflatable structure 106, at least along the volume 108, to facilitate efficiently imparting lift force from the lifting gas 109 to the aircraft 102. In this context, a material or combination of materials having substantial impermeability to diffusion of the lifting gas 109 shall be understood to include latex, neoprene, or any one or more of various different materials for which the diffusion rate of hydrogen is less than or equal to the diffusion rate of hydrogen through latex or neoprene, under otherwise identical conditions.

In some instances, to facilitate movement of the condensate 111 toward the drain valve 110, the material forming the inflatable structure 106 may be substantially hydrophobic at least along the volume 108. As shall be appreciated, in instances in which the inflatable structure 106 is formed of substantially hydrophobic material at least along the volume 108, the inflatable structure 106 generally does not absorb the condensate 111 before the condensate 111 can reach the drain valve 110. That is, the use of substantially hydrophobic material may facilitate efficient removal of the condensate 111 from the volume 108. In this context, a material or combination of materials that are substantially hydrophobic shall be understood to include latex, neoprene, polyester, or any one or more of various different materials having at least the same hydrophobicity as latex, neoprene, or polyester, under otherwise identical conditions.

By way of example and not limitation, the inflatable structure 106 may include a balloon 124, as may be particularly useful for implementations related to unmanned observation. That is, being a bluff body, the balloon 124 may be effectively driven by prevailing winds, without the need for separate propulsion. Additionally, or alternatively, the balloon 124 may have substantially rounded outer edges to reduce the likelihood of becoming snagged on impediments in the path of the inflatable structure 106 and/or to reduce the likelihood of creating a hazard to property or individuals on the ground as the aircraft 102 descends. Further, or instead, the balloon 124 may reduce or eliminate the need for seams that may otherwise compromise the ability of the inflatable structure 106 to contain the lifting gas at high pressures useful for achieving high altitude.

In certain instances, the balloon 124 may include a compliant material (e.g., one or more of latex or neoprene), as may be useful for efficiently storing the inflatable structure 106 when it is not in use. Additionally, or alternatively, in some instances, the balloon may include a semi-compliant material, such as may be useful for imparting a high strength-to-weight ratio to the inflatable structure 106. Such a high strength-to-weight ratio of the inflatable structure 106 may be particularly useful, for example, in instances in which the lifting gas 109 includes hydrogen and safety considerations warrant the use of material offering a high amount of resistance to puncture, abrasion, or other types of degradation that may result in inadvertent escape of the hydrogen. As an example, the semi-compliant material may include woven from filaments of one or more thermoplastic polymers, with the compliance of the semi-compliant material changing as the thermoplastic polymers are heated and cooled during preparation and flight of the aircraft 102.

The inflatable structure 106 may, in some implementations, include a ballast section 126 to facilitate providing stability to the aircraft 102, as may be useful for maintaining the aircraft 102 in a particular orientation and/or reducing movement of the aircraft 102 that may otherwise interfere with measurement instruments carried by the payload of the aircraft 102. In general, the ballast section 126 may be disposed relative to the drain valve 110 in an orientation in which the condensate 111 condensed in the volume 108 collects in the ballast section 126 (e.g., under the force of gravity) as the condensate 111 moves toward the drain valve 110. That is, the weight of the condensate 111 collected in the ballast section 126 may impart stability to the aircraft 102 with respect to lateral forces exerted (e.g., by wind) on the aircraft 102 in a deployed orientation in which the volume 108 of the inflatable structure 106 is above the ballast section 126 as the aircraft 102 is in flight. Thus, for example, the drain valve 110 may be controllable to expel the condensate 111 to ballast the inflatable structure 106 while maintaining a substantially gas-tight seal between the volume 108 and the environment outside of the volume 108 according to any one or more of the various different techniques described herein. That is, the drain valve 110 may expel an excess amount of the condensate 111 when the condensate 111 collected in the ballast section 126 is above a predetermined amount of the condensate 111 useful for providing ballast associated with a desired amount of stability.

As may be appreciated from the foregoing, accumulation of the predetermined amount of the condensate 111 in the ballast section 126 may occur over time as the aircraft 102 undergoes flight. Such gradual accumulation of the condensate 111 in the ballast section 126 may be useful for balancing competing considerations associated with retaining the condensate 111 to provide ballast to the aircraft 102 and expelling the condensate 111 to improve buoyancy of the aircraft 102. That is, at lower altitudes—before a significant amount of the condensate 111 has accumulated in the ballast section 126—conditions may be calmer such that less stabilization is generally required. At higher altitudes—after the predetermined amount of the condensate 111 has accumulated in the ballast section 126—conditions may be more turbulent such that the increased stabilization provided by the predetermined amount of the condensate 111 justifies the weight associated with carrying the predetermined amount of the condensate 111.

Returning to the example in which the drain valve 110 includes the float valve 112, the level at which movement of the ball float 114 moves the piston 118 away from the seat 122 may correspond to the predetermined amount—and, thus, a predetermined weight—of the condensate 111 useful for imparting ballast while having an acceptable impact on lift of the aircraft 102. While the level of the float valve 112 may be fixed in certain instances such that the ballast section 126 provides the same amount of ballast regardless of environmental conditions, it shall be understood that the level of the float valve 112 may be adjustable according to environmental conditions. Continuing with this example, the ball float 114 may be adjustable to a lower level such that a smaller amount (and, thus, lower weight) of the condensate 111 may be retained in the ballast section 126 in instances in which environmental conditions over the expected course of flight of the aircraft are expected to be calm. In this way, adjustment of the level of the ball float 114 may be used to arrive at a suitable ballast level in view of the trade-off between ballast and achievable altitude of the aircraft 102 under otherwise identical conditions.

Having described certain features of the aircraft 102, attention is turned now to description of the delivery system 104 that may be used to generate the lifting gas 109 and deliver the lifting gas 109 into the volume 108 to provide buoyancy to the aircraft 102, with the buoyancy being suitable for a particular mission intended for aircraft 102. For the sake of clear and efficient description, the delivery system 104 and the aircraft 102 are described as discrete aspects of the aircraft system 100, with the aircraft 102 decoupled from the delivery system 104 prior to flight such that the aircraft 102 does not carry excess weight. It shall be appreciated, however, that certain portions of the delivery system 104 may remain coupled to the aircraft 102 during flight, to the extent there is a benefit in maintaining such coupling. Specifically, unless otherwise specified or made clear from the context, electronics (e.g., control system, thermocouples and/or pressure sensors) used to prepare the aircraft 102 for flight shall be understood to be permanently coupled or releasably coupled to the aircraft 102, as may be useful to facilitate launch and/or monitor conditions in the volume 108 during flight. Further, in the description that follows, emphasis is generally placed on aspects of the delivery system 104 that facilitate using the aircraft system 100 in the field, where conditions and availability of resources may be unpredictable. It shall be appreciated, however, that such aspects facilitating use of the aircraft system 100 in the field may be useful for facilitating launches under controlled and predictable conditions, to the extent that such aspects improve error tolerance, lower cost, and/or improved safety.

In certain implementations, the delivery system 104 may include a reactor 128 defining a chamber 130, an inlet region 132, and an outlet region 134. In general, the inlet region 132 and the outlet region 134 may be in fluid communication with one another and with the chamber 130. For example, the inlet region 132 may be in fluid communication with the outlet region 134 via the chamber 130 such that fluid moving into the inlet region 132 must pass through the chamber 130 before reaching the outlet region 134, as may be useful for reducing the likelihood of cross-contamination of inlet streams and outlet streams while being achievable using a straightforward valving arrangement. As another example, however, the inlet region 132 and the outlet region 134 may be co-located with one another relative to the chamber 130, as may be useful for locating the inlet region 132 and the outlet region 134 on a single side of the reactor 128—an orientation that may be well-suited for rapidly setting up and breaking down the delivery system 104 and/or well-suited for mounting the delivery system 104 within an available footprint (e.g., on a vehicle).

In general, at least the portions of the reactor 128 defining the chamber 130 and the outlet region 134 may be formed of one or more materials that are inert in the presence of the reactants and the products associated with a chemical reaction in the chamber 130. Further, or instead, the structural characteristics of the one or more materials forming the chamber 130 and the outlet region 134 remain otherwise unchanged by exposure to the temperature and pressure associated with the chemical reaction in the chamber 130. By way of example, and not limitation, the chemical reaction in the chamber 130 may include exposing aluminum to water in a reaction that produces hydrogen, heat, and one or more aluminum hydroxides. As may be appreciated from the foregoing example, forming hydrogen and heat (each of which contribute to lift capacity of the lifting gas 109) in this way may be particularly advantageous, given that the reactants may be readily sourced and safe and the only unusable byproduct is aluminum hydroxide, which is non-toxic and can be recycled or disposed of safely. A challenge with forming hydrogen and heat in this way, however, is that a stable oxide coating forms rapidly on the aluminum, forming a barrier to the aforementioned reaction between aluminum and water under normal environmental conditions. Accordingly, the reaction of aluminum and water to produce hydrogen may be carried out using aluminum that has been treated to overcome the challenges associated with the oxide coating. As an example, aluminum that has been treated as described in U.S. Pat. No. 10,745,789, issued on Aug. 18, 2020, and entitled "ACTIVATED ALUMINUM FUEL," the entire contents of which are hereby incorporated herein by reference. Thus, continuing with this example, the one or more materials forming the reactor 128 at least along the chamber 130 may be any one or more of various different materials suitable for withstanding exposure to the reaction of such activated aluminum with water to form hydrogen and heat. Examples of such material include, but are not limited to, plastic, stainless steel, glass, or other commonly available and inexpensive material.

In certain instances, the inlet region 132 of the reactor 128 may be releasably securable in fluid communication with a fluid source 136 to introduce at least one reactant into the chamber 130. In certain implementations, the fluid source 136 may be above the reactor 128, and the at least one reactant may flow from the fluid source 136 into the chamber under the force of gravity. The use of gravity in this way may be useful, for example, reducing or eliminating pumping requirements in implementations that do not require precise metering of the at least one reactant in to the chamber 130. In particular, returning to the example of activated aluminum fuel, the fluid source 136 may be a source of water. Advantageously, reaction of the activated aluminum to form hydrogen does not require any particular water quality, making both fresh water, brackish, and saltwater sources encountered in the field useful as the fluid source 136. Combining this feature with the stability of the active aluminum over a range of conditions and formability into readily portable form factors (e.g., pellets), it shall be appreciated that formation of the reactor 128 to accommodate forming hydrogen from the activated aluminum may be particularly useful for facilitating portability and usefulness of the aircraft system 100 in the field. While gravity may be used in some instances, it shall be appreciated that the fluid source 136 may, additionally or alternatively, include a pump to facilitate moving the at least one reactant from the fluid source 136 into the chamber 130.

The outlet region 134 of the reactor 128 may, in general, be formed of any one or more materials suitable for withstanding exposure to the products and temperatures associated with the reaction in the chamber 130. Additionally, or alternatively, the outlet region 134 of the reactor 128 may be in gas-tight fluid communication with the volume 108 of the aircraft 102 to reduce the likelihood of contaminants into the flow. For example, in instances in which the flow through the outlet region 134 includes hydrogen, the gas-tight fluid communication between the outlet region 134 and the volume 108 of the aircraft 102 may reduce the likelihood of introducing oxygen into the flow received into the volume 108 of the aircraft 102 in amounts forming a combustible mixture with the hydrogen.

In some implementations, the delivery system 104 may include an exhaust 138 in fluid communication between the outlet region 134 of the reactor 128 and the volume 108 via the drain valve 110 of the aircraft 102. In general, the exhaust 138 may be formed of any one or more of various different types of tubing (e.g., flexible, rigid, or a combination thereof) suitable for withstanding exposure to the products and temperatures of the flow from the outlet region 134 of the reactor 128. Additionally, or alternatively, the exhaust 138 may be formed of one or more thermally insulating materials to reduce unintended heat transfer between the flow in the exhaust 138 and the environment outside of the exhaust 138. Further, or instead, it shall be understood that the exhaust 138 may be connected to the outlet region 134 according to any one or more of various different techniques known for releasably and/or fixedly connecting tubing to a port or other orifice with a gas-tight seal.

In some instances, the flow moving from the outlet region 134 toward the volume 108 via the drain valve 110 of the aircraft 102 may be processed along the exhaust 138, as may be useful for achieving target parameters of the lifting gas 109 ultimately received into the volume 108. While such processing is generally useful for controlling parameters of lifting gas of any provenance, it shall be appreciated that processing the flow moving along the exhaust 138 may be particularly useful in instances in which the lifting gas 109 (or a precursor to the lifting gas 109) is formed in situ in the chamber 130. That is, in the field, it may be difficult or undesirable to achieve precise composition of the components of the flow generated in the chamber 130 and moved, through the outlet region 134, into the exhaust 138. In some instances, such imprecision may be particularly challenging when it is desirable or necessary to use one or more components from a locally available resource (e.g., a local water source). Further, or instead, the reaction carried out in the chamber 130 of the reactor 128 may include one or more byproducts that, in the proportions generated in the chamber 130, may not necessarily be useful for introduction into the volume 108. Accordingly, if may be useful to remove at least a portion of such byproducts from the flow moving along the exhaust 138, toward the volume 108 of the aircraft 102.

As an example, the delivery system 104 may include a swirl separator 140 to separate one or more light components from one or more heavier gaseous components (e.g., components formed from impurities in the fluid source 136) in the flow from the outlet region 134 of the reactor 128 and direct the hydrogen from the swirl separator 140 toward the volume of the inflatable structure. The swirl separator 140 may be, for example, disposed along the exhaust 138, between the outlet region 134 of the reactor 128 and the drain valve 110 of the aircraft 102. The flow from the outlet region 134 may move into the swirl separator 140, where swirl is imparted to the flow. Returning again to the example of forming hydrogen by exposing activated aluminum to water, the radial forces imparted on the flow moving through the swirl separator 140 may be effective in separating hydrogen and steam from heavier liquid components (e.g., condensed water) to form the lifting gas 109. That is, continuing with this example, the lifting gas 109 exiting the swirl separator 140 may have a higher volumetric concentration of hydrogen and steam than the volumetric concentration of hydrogen and steam in the flow moving into the swirl separator 140. That is, by separating liquid components from gaseous components, the swirl separator 140 may increase the lift capacity of the lifting gas 109 moving through the swirl separator 140. As a specific example, the swirl separator 140 may be a swirl vane separator and, thus, may increase lift capacity of the flow moving through the swirl separator 140 without the use of external power or moving parts, with such features being useful for robust performance in generating the lifting gas 109 the field.

In certain implementations, the aircraft system 100 may include a controller 142 having a processing unit 144 and a computer-readable storage medium 146 having stored thereon instructions for causing the processing unit 144 to carry out one or more aspects of any of the various different techniques described herein for forming the lifting gas 109 and delivering the lifting gas 109 into the volume 108 of the aircraft 102. In certain implementations, all or a portion of the controller 142 may be decoupled from the aircraft 102 once the inflatable structure 106 has been sufficiently inflated for flight. In some implementations, however, all or a portion of the controller 142 may remain coupled to the aircraft 102 during flight such that the controller 142 is part of the payload carried by the aircraft 102 and the computing facility of the controller 142 may be used to monitor changing conditions of the lifting gas 109 in the volume 108 and/or to provide computing capacity for observations carried out by the aircraft 102 during flight.

In some implementations, the controller 142 may operate based on feedback from one or more signals related to conditions in the volume 108 as the lifting gas 109 is moved into the volume 108 via the drain valve 110 or another orifice in fluid communication with the volume 108 and the delivery system 104. For example, the controller 142 may include a pressure sensor 148 in electrical communication with the processing unit 144 and disposed relative to the volume 108 to sense pressure in the volume 108. Additionally, or alternatively, the controller 142 may include a temperature sensor 150 in electrical communication with the processing unit 144 and disposed relative to the volume 108 to sense temperature in the volume 108. Thus, as described in greater detail below, the pressure sensor 148 and the temperature sensor 150 may be used to determine a density in the volume 108 and, thus, provide an indication of lift capacity of the lifting gas 109 in the volume 108 as the lifting gas 109 is received into the volume 108 during inflation. Still further, or instead, the controller 142 may include a motion sensor 151 in electrical communication with the processing unit 144 and coupled to the aircraft 102 (e.g., coupled in proximity to the drain valve 110) to detect motion of the aircraft 102 indicative of flight. For example, in instances in which the controller 142 is carried with the aircraft 102 during flight, the signal from the motion sensor 151 may provide an indication to the controller 142 that the aircraft 102 is no longer being prepared for flight and the controller 142 may control the drain valve 110 to expel water from the volume 108 in instances in which the drain valve 110 includes one or more electronic components, such as an electronically actuated valve by itself or in combination with the float valve 112. As described in greater detail below, controlling the drain valve 110 based on the motion sensor 151 may be useful for providing an appropriate amount of ballast to the aircraft 102 to facilitate achieving stable flight.

In certain implementations, the controller 142 may include a user interface 152 to receive one or more inputs from an operator. The user interface 152 may be any one or more of various different types of user interfaces, examples of which include, but are not limited to a keyboard, a mouse, a touchscreen, voice command, etc. In certain implementations, the user interface 152 may receive information related to the intended mission of the aircraft 102. Such information may include, for example, target altitude for the aircraft 102.

Figure 2:
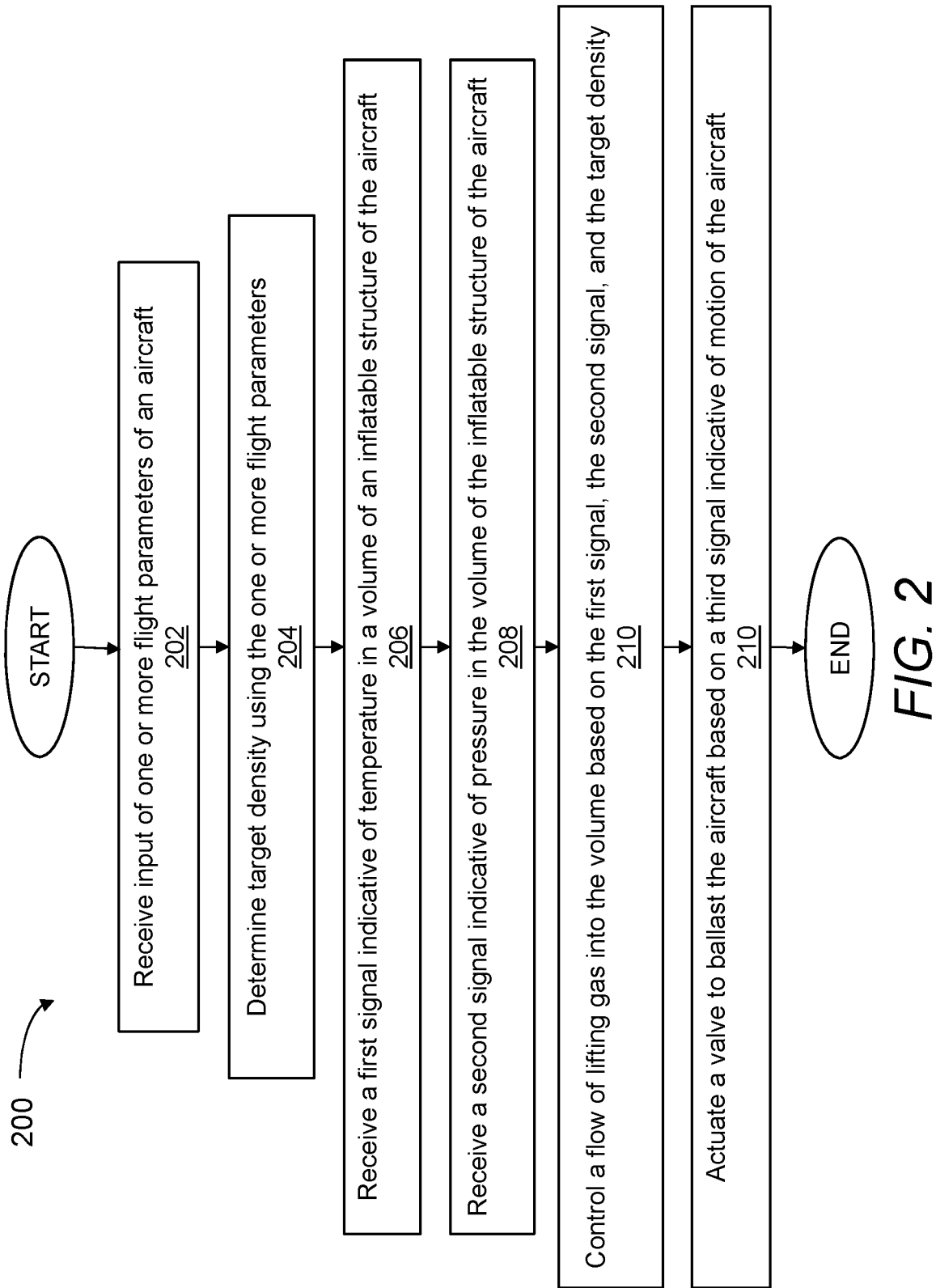
FIG. 2 is a flowchart of an exemplary method of controlling lift of an aircraft propelled by buoyancy of a lifting gas.

FIG. 2 is a flowchart of an exemplary method 200 of controlling lift of an aircraft propelled upward by low density (buoyancy) relative to air and volume of a lifting gas. Unless otherwise specified or made clear from the context, the exemplary method 200 may be implemented using any one or more of the various different systems, and components thereof, described herein. Thus, for example, the exemplary method 200 may be implemented as computer-readable instructions stored on the computer-readable storage medium 146 (FIG. 1A) and executable by the processing unit 144 (FIG. 1A) of the controller 142 (FIG. 1A) to operate the delivery system 104 and/or the aircraft 102 of aircraft system 100 (FIG. 1A).

As shown in step 202, the exemplary method 200 may include receiving input related to one or more flight parameters of the aircraft. The aircraft may be, for example, any one or more of the various different aircraft described herein as including an inflatable structure defining a volume. The input may be, for example, provided an operator through a user interface (e.g., the user interface 152 of the controller 142 in FIG. 1A). Additionally, or alternatively, the input including the target altitude for the aircraft may be received in a communication from a remote location through wired and/or wireless communication with a controller, such as the controller 142 (FIG. 1A).

The input related to the one or more flight parameters of the aircraft may include, for example, a target altitude for the aircraft. In aircraft propelled at least partially by buoyancy, the target altitude may be particularly useful for facilitating achievement of mission goals of the aircraft, particularly during unmanned flight. For example, the target altitude may represent an approximation of a maximum altitude to be achieved by the aircraft to provide useful observations. Further, or instead, the target altitude may represent a minimum altitude for providing useful observations. In certain instances, the input related to the one or more flight parameters of the aircraft may include information about known environmental conditions (e.g., temperature and/or altitude above sea level) at the launch site and/or along one or more points along an expected flight path of the aircraft (e.g., environmental conditions at the target altitude). Such parameters regarding environmental conditions may, for example, facilitate more accurate determinations of the flight path of the aircraft, as compared to determinations made without information about environmental conditions.

Similarly, to facilitate accurate determinations of the flight path of the aircraft, the input related to the one or more flight parameters may include one or more parameters related to weight of the aircraft, including any payload (e.g., instrumentation and/or supplies) carried by the aircraft. Thus, more generally, the input related to the one or more flight parameters may be any one or more of various different conditions useful for determining initial parameters of the lifting gas in the volume of an aircraft to facilitate lifting the aircraft along an approximate flight path associated with a particular mission of the aircraft.

As shown in step 204, the exemplary method 200 may include determining a target density of a lifting gas in the volume according to a model stored on the one or more non-transitory computer storage media. The model may be any one or more of various different empirical, semi-empirical, or non-empirical models suitable for calculating the target density of the lifting gas that, based on the model, is expected to result in lifting the aircraft to the target altitude. By way of example, and not limitation, the model may be based on the buoyancy equation (Eq. 1) described above and solving (e.g., numerically) for an initial density of the lifting gas at time=0. Additionally, or alternatively, the model may be based on data from actual flight parameters of the same or like aircraft using the same or similar lifting gas. In certain instances, the model may indicate how much of one or more reactants are required to generate a required amount of lifting gas. In some instances, the model may also, or instead, determine the maximum load that can be carried by the lifting gas such that the aircraft will continue rising through the atmosphere even as the aircraft loses buoyancy due to formation of condensate in a volume defined by an inflatable structure of the aircraft.

As an example, returning again to the example of forming hydrogen and steam through reaction of activated aluminum and water, the model may indicate a minimum amount of activated aluminum and water needed to produce a sufficient amount of lifting gas need to achieve the target density and, thus, the required amount of lift needed for the aircraft. The indication of the minimum amount of activated aluminum may be based on theoretical and/or experimental determinations of yield of hydrogen and steam formed from a given amount of activated aluminum exposed to water. Importantly, because the devices and systems described herein are robust with respect to the presence of steam and/or condensed water and provide control over lift capacity of lifting gas in the volume of an aircraft, it shall be generally understood that an indication of only a minimum amount of each reactant may be generally sufficient for generating the lifting gas at the launch site. In some use cases, this may be significant in facilitating rapid deployment of the aircraft and/or facilitating deployment of the aircraft by personnel without specialized training.

As shown in step 206, the exemplary method 200 may include receiving a first signal indicative of temperature of the lifting gas in the volume. The first signal may be received, for example, from a temperature sensor (e.g., one or more thermocouples) disposed relative to the volume at a position suitable for providing an accurate indication of the temperature of the lifting gas in the volume. In certain instances, the temperature sensor may be disposed outside of the volume (e.g., in the vicinity of an inlet to the volume, such as at the drain valve), as may be useful for disconnecting the temperature sensor from the aircraft prior to flight. Additionally, or alternatively, the temperature sensor may be disposed inside of the volume, as may be useful for providing accurate indications of temperature as the aircraft is being prepared for flight and/or during flight.

As shown in step 208, the exemplary method 200 may include receiving, from a pressure sensor, a second signal indicative of pressure of the lifting gas in the volume. The pressure sensor may be disposed, for example, in the volume. Further, or instead, the pressure sensor may remain in the volume during flight of the aircraft, such as may be useful for providing feedback to a controller regarding the lifting gas in the volume during flight of the aircraft.

As shown in step 210, the exemplary method 200 may include controlling a flow of the lifting gas into the volume from a source in fluid communication with the volume. For example, the flow of the lifting gas into the volume may be based on the first signal indicative of temperature, the second signal indicative of pressure, and the target density. That is, the first signal and the second signal may be used to determine density of the lifting gas in the volume. In some cases, the determination of density of the lifting gas in the volume may be based on any one or more of various different approximations of composition of the lifting gas in the volume. Examples of such approximations include, but are not limited to the following: assuming the lifting gas is the heaviest gaseous product of a reaction used to produce the lifting gas, assuming the lifting gas is the lightest gaseous product of a reaction used to produce the lifting gas, or assuming the lifting gas has a composition in the volume corresponding to a theoretical composition of products formed from the reaction carried out in the reactor. An additional, or alternative, approach to measuring buoyancy of the lifting gas may include measuring the lifting force of the aircraft before takeoff via a force sensor or load cell. Once the target density of the lifting gas has been achieved, flow of the lifting gas into the volume may be interrupted by sending a signal to close a valve (e.g., the drain valve 110 and/or any one or more of various different valves disposed along the exhaust 138 in FIG. 1A).

As shown in step 212, the exemplary method 200 may include receiving, from a motion sensor, a third signal indicative of movement of the inflatable structure. That is, the motion sensor may provide an indication of whether the aircraft is being prepared for flight or is in flight. In general, delineation between these two states may be useful for carrying out specific controls particular to each state. For example, in instances in which the motion sensor indicates that the aircraft is still such that it is being prepared for flight, a controller may carry out one or more control functions associated with providing a lifting gas to a volume of the aircraft. Additionally, or alternatively, in instances in which the motion sensor indicates that the aircraft is moving such that it is in flight, the controller may carry out one or more control functions associated with achieving efficient flight. As a specific example, based on the third signal provided by the motion sensor, actuation of a drain valve in fluid communication with the volume of the inflatable structure may be selectively controlled such that moisture condensed in the volume is selectively released from the inflatable structure to ballast the inflatable structure. That is, as the third signal indicates a larger amount of motion, the drain valve may remain closed to retain more moisture in the volume to provide more ballast to the aircraft (e.g., to provide stabilization that may be useful for carrying out certain observations, such as photographic observations). As the third signal indicates a smaller amount of motion, the drain valve may be opened to retain less moisture in the volume and, thus, reduce the amount of dead weight carried by the aircraft. Thus, in general, the third signal from the motion sensor may be useful for achieving a balance between competing considerations related to stable flight and achieving the target altitude.

Having described various aspects of aircraft systems including delivery systems that produce lifting gas for providing lift to aircraft, attention is now turned to other techniques that may be used in preparing a lifting gas for providing lift to aircraft. The techniques described below are described separately from each other and separately from the techniques described above for the sake of clear and efficient explanation. Thus, unless otherwise specified, or made clear from the context, it shall be understood that any one or more of the various different techniques described below may be used in addition to, or instead of, the various different techniques described above.

Figure 3:
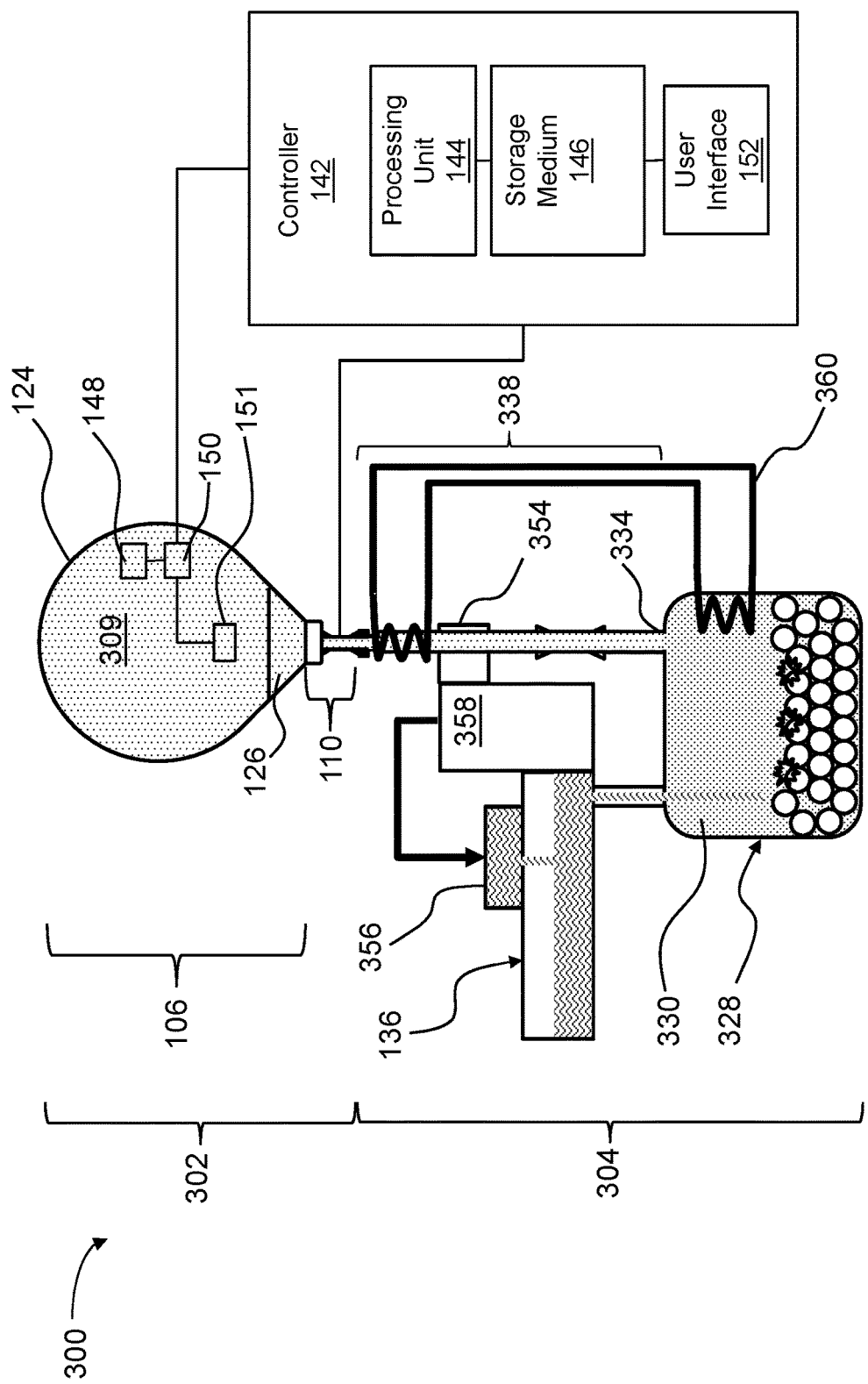
FIG. 3 is a schematic representation of an aircraft system including a delivery system having a condenser.

Referring now to FIG. 3, an aircraft system 300 may include an aircraft 302 and a delivery system 304. For the sake of clear and efficient description, elements of the aircraft system 300 should be understood to be analogous to or interchangeable with elements of the aircraft system 100 corresponding to 100-series element numbers (e.g., in FIGS. 1A-1D) described herein, unless otherwise explicitly made clear from the context and, therefore, are not described separately from counterpart 100-series element numbers, except to note differences and/or to emphasize certain features. Thus, for example, the aircraft 302 of the aircraft system 300 shall be understood to be identical the aircraft 102 (FIGS. 1A-1D), except to any extent indicated.

The delivery system 304 may include an exhaust 338, a condenser 354, and a container 356. The exhaust 338 may extend from an outlet region 334 of a reactor 328 to the aircraft 302 such that the aircraft 302 and the chamber 330 of the reactor 328 may be in fluid communication as the aircraft 302 is filled with a lifting gas 309. For example, in instances in which hydrogen is formed from reacting aluminum and water, the exhaust 338 may pass through the condenser 354, where moisture in the flow entering the condenser 354 may condense into the container 356 in fluid communication with the condenser 354 to decrease the density of the lifting gas 309. By condensing at least a fraction of the steam in the condenser 354, the volumetric concentration of hydrogen in the lifting gas 309 is increased, thus increasing the lift capacity of the lifting gas 309. Steam and any reaction byproduct that travels with the hydrogen into the aircraft 302 may later condense to form a condensate releasable from the aircraft 302 according to any one or more of the various different techniques described herein.

In some implementations, the condensate condensed in the condenser 354 and collected in the container 356 is also one of the reactants used in the reaction taking place in the chamber 330, the container 356 may be in fluid communication with a fluid source 336 (e.g., the condensate from the condenser 354 may empty into the fluid source 336 such that the fluid source 336 is also the container 356). As may be appreciated, such recirculation of the condensate may advantageously result in more efficient use of the reactant being delivered from the fluid source 136 into chamber 330 for reaction to produce the lifting gas 309 and/or a precursor to the lifting gas 309. In turn, this may reduce the overall size required for the fluid source 336.

In certain implementations, the delivery system 304 may include a first heat exchanger 358 in thermal communication with the condenser 354 to facilitate forming the fluid collected in the container 356. The first heat exchanger 358 may be, for example, in thermal communication between the condenser 354 and the fluid source 336 such that the fluid source 336 provides cooling useful for condensing the fluid out of the flow moving through the condenser 354. Additionally, or alternatively, the first heat exchanger 358 may include a separate cooling fluid (e.g., a refrigerant), such as may be useful for launching the aircraft 302 in hot environmental conditions (e.g., such as those encountered in the environment).

Additionally, or alternatively, the delivery system 304 may include a second heat exchanger 360 in thermal communication with the chamber 330 of the reactor 328, as may be particularly useful in instances in which the reaction carried out in the chamber 330 is exothermic (e.g., the formation of hydrogen through reaction of aluminum and water). For example, the second heat exchanger 360 may facilitate further heating the lifting gas 309, moving through the exhaust 338, just prior to introducing the lifting gas 309 into the aircraft 302. In particular, to the extent condensation of the fluid at the condenser 354 removes heat from the flow moving through the condenser 354, at least some of the removed heat may be reintroduced into the lifting gas 309 via the second heat exchanger 360. Such additional heat reduces the density of the lifting gas 309—thus, increasing the lift capacity of the lifting gas 309. Thus, in general, it shall be appreciated that the first heat exchanger 358 (to condense some water or other components from the lifting gas 309 to decrease density of the lifting gas 309 prior to delivery into the aircraft 302) and the second heat exchanger 360 (to add heat to the lifting gas 309 prior to delivery of the lifting gas 309 into the aircraft 302, given that the higher temperature of the lifting gas 309 results in lower density and, thus, greater buoyancy in air) may each contribute to increasing lift capacity of the lifting gas 309 and, when used in combination with one another, the resulting increase in lift capacity of the lifting gas 309 may be greater than otherwise achievable with each heat exchanger individually. That is, returning again to the example of reacting aluminum and water to produce hydrogen, the first heat exchanger 358 may condense some water from the lifting gas 309 to decrease density of the lifting gas 309 and, the lifting gas 309 with the lower water content, may then be heated by the second heat exchanger 360 to decrease further the density of the lifting gas 309 with lower water content before the lifting gas 309 is delivered to the aircraft 302.

Figure 4:
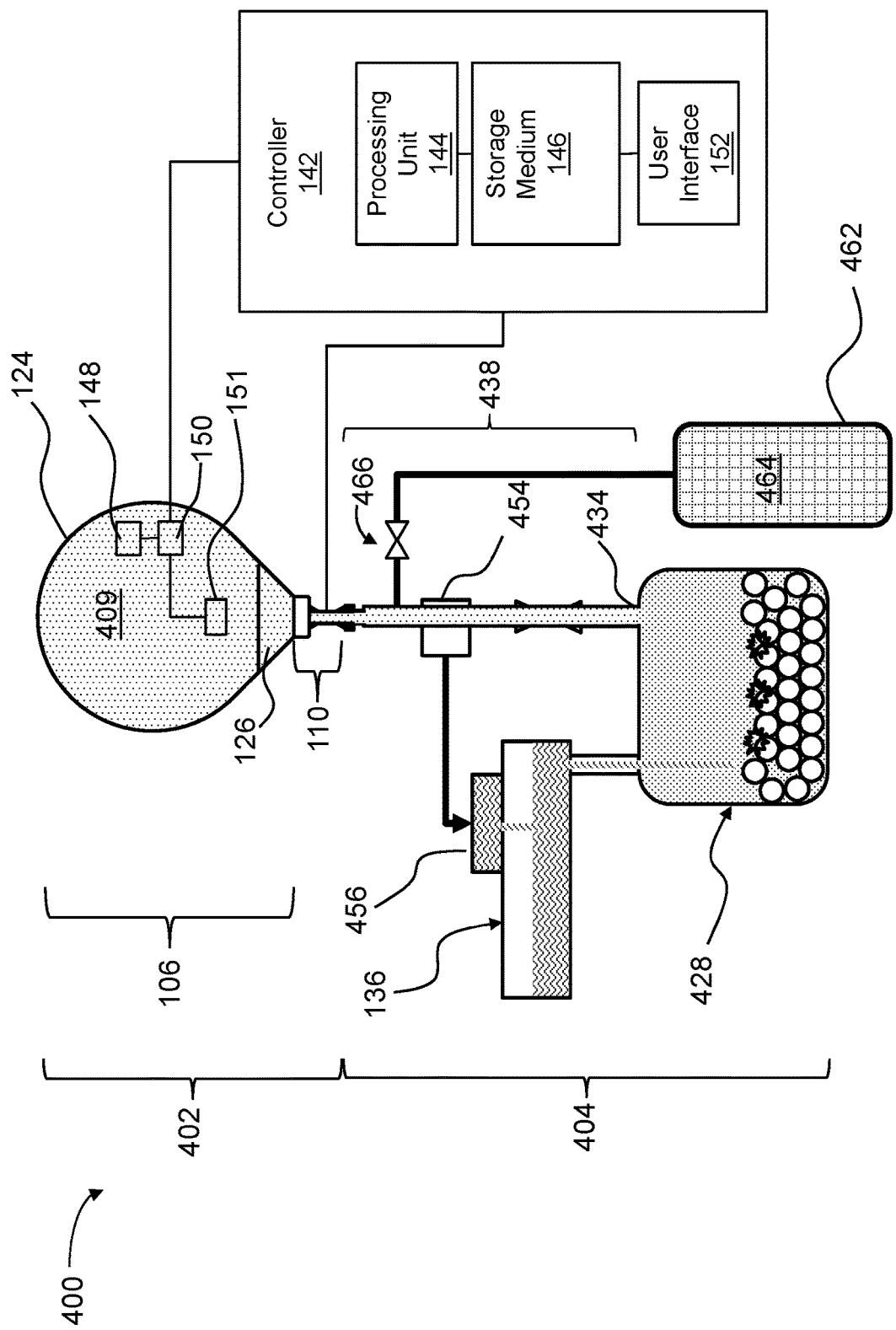
FIG. 4 is a schematic representation of an aircraft system including delivery system having an auxiliary gas.

Referring now to FIG. 4, an aircraft system 400 may include an aircraft 402 and a delivery system 404. For the sake of clear and efficient description, elements of the aircraft system 400 shall be understood to be analogous to or interchangeable with elements of the aircraft system 100 corresponding to 100-series element numbers (e.g., in FIGS. 1A-1D) and/or elements of the aircraft system 300 corresponding to 300-series element numbers (e.g., in FIG. 3), unless otherwise explicitly made clear from the context and, therefore, are not described separately from counterpart 100-series element numbers or 300-series element numbers, as the case may be, except to note differences and/or to emphasize certain features. Thus, for example, the aircraft 402 of the aircraft system 400 shall be understood to be identical to the aircraft 102 (FIGS. 1A-1D), except to any extent indicated. Additionally, or alternatively, the delivery system 404 may include a condenser 454 and a container 456 which shall be understood to be identical to the condenser 354 (FIG. 3) and the container 356 (FIG. 3), respectively.

The delivery system 404 may include an auxiliary gas source 462 in fluid communication with the aircraft 402 (e.g., in fluid communication with a volume of an inflatable structure of the aircraft 402). In use, the auxiliary gas source 462 may be actuatable to mix an auxiliary gas 464 from the auxiliary gas source 462 with a lifting gas 409 moving in an exhaust 438 from an outlet region 434 of the reactor 428 toward the aircraft 402, where a mixture may be received into a volume of the aircraft 402 (e.g., as described above with respect to the volume 108 of the aircraft 102 in relation to FIGS. 1A-1D). In certain instances, the auxiliary gas source 462 may be a pressurized gas bottle, which may be advantageous for delivery the auxiliary gas 464 with a tightly controlled composition.

In general, the auxiliary gas 464 may be any one or more of various different gas compositions useful for improving safety and/or lift capacity of the lifting gas 409. Accordingly, by way of example, and not limitation, in instances in which water is removed from the lifting gas 409 moving through the condenser 454, the auxiliary gas 464 may be a gas having a lower density than water. As shall be appreciated, the net result of processing the lifting gas 409 in this way may be that the lift capacity of the lifting gas 409 is increased relative to the lift capacity of the flow initially entering the exhaust 438 from the outlet region 434 of the reactor 428. Additionally, or alternatively, the auxiliary gas 464 may be relatively inert relative to the lifting gas 409 such that the mixture of the auxiliary gas 464 and the lifting gas 409 is less combustible than the lifting gas 409 alone. As a specific example of each of these advantages, the auxiliary gas 464 may be helium—an inert gas that has a lower density than steam. While helium is a non-renewable resource that may present certain challenges with respect to storage and transport, the use of helium as the auxiliary gas 464 may result in use of much less helium than would be otherwise required to lift the aircraft 402 using helium alone. As compared to larger quantities of helium, these smaller quantities of helium may be more easily deployable in the field.

The flow rate of the auxiliary gas 464 relative to the flow rate of the lifting gas 409 may change the lift capacity and/or the combustibility of the resulting mixture. Accordingly, in certain instances, the delivery system 404 may include a valve 466 adjustable to control a ratio of the auxiliary gas 464 to the lifting gas 409 ultimately delivered to the aircraft 402. For example, the valve 466 may be manually adjustable to increase or decrease the flow of the auxiliary gas 464. As another example, the valve 466 may be electronically adjustable based on one or more parameters (e.g., pressure and temperature) in the volume of the aircraft 402 and/or based on a quantity of fluid condensed out of the lifting gas 409.

Figure 5A:
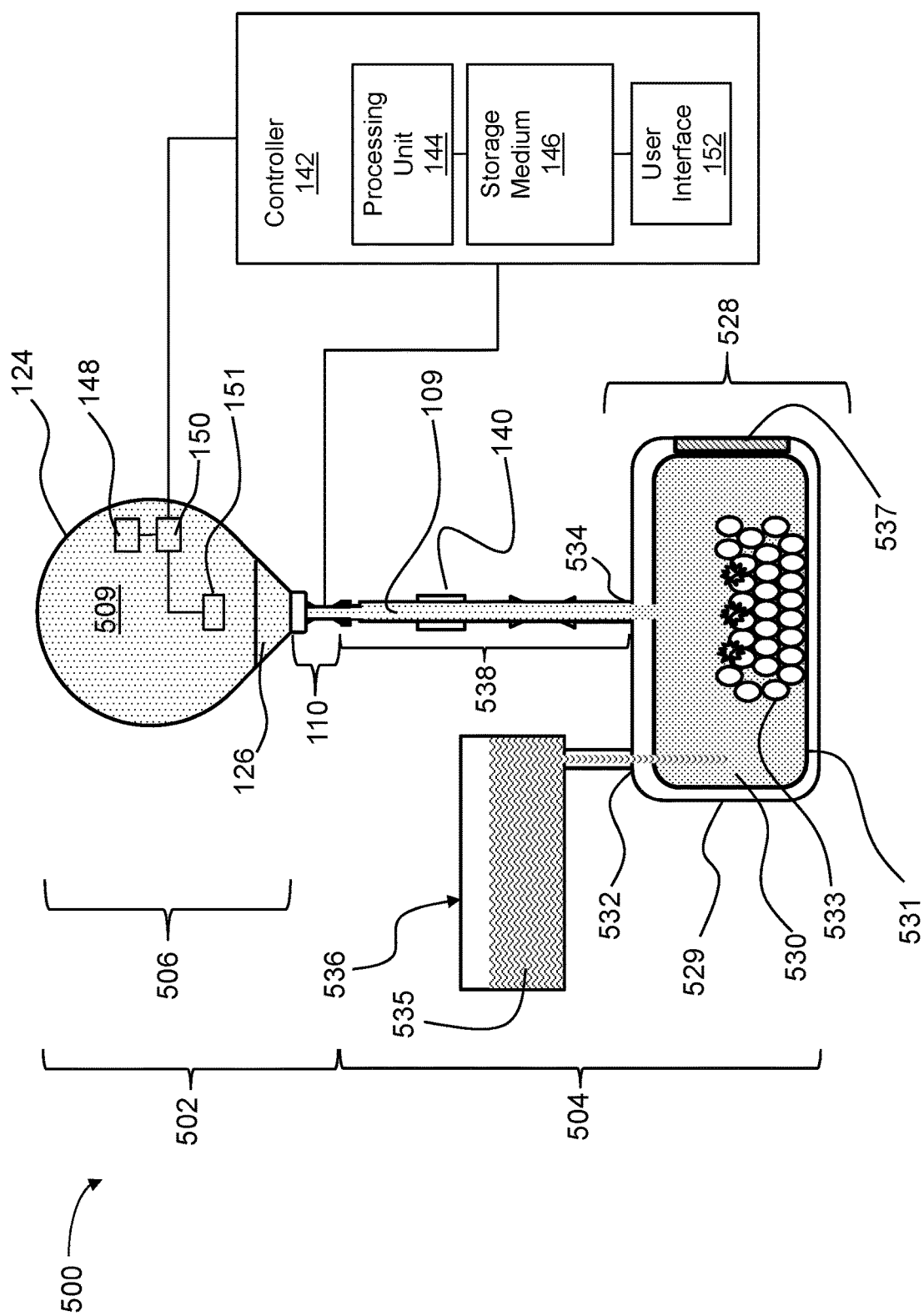
FIG. 5A is a schematic representation of an aircraft system including a delivery system having a reactor with a removable liner.
Figure 5B:
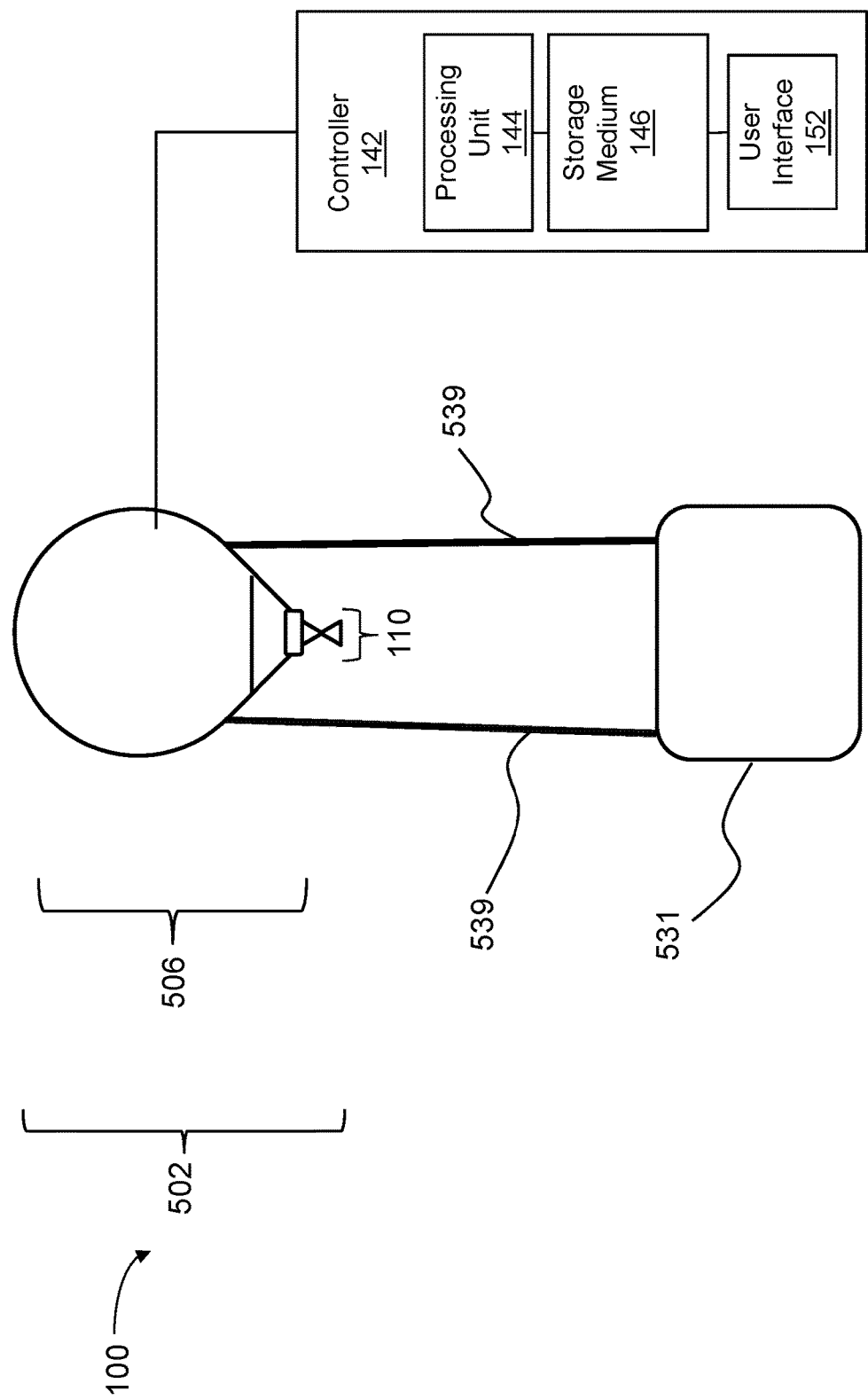
FIG. 5B is a schematic representation of the removable liner of FIG. 5A tethered to an aircraft of the aircraft system of FIG. 5A.

Referring now to FIGS. 5A and 5B, an aircraft system 500 may include an aircraft 502 and a delivery system 504. For the sake of clear and efficient description, elements of the aircraft system 500 shall be understood to be analogous to or interchangeable with elements of the aircraft system 100 corresponding to 100-series element numbers (e.g., in FIGS. 1A-1D), elements of the aircraft system 300 corresponding to 300-series element numbers (e.g., in FIG. 3), and/or elements of the aircraft system 400 corresponding to 400-series element numbers (e.g., in FIG. 4), unless otherwise explicitly made clear from the context and, therefore, are not described separately from counterpart 100-series element numbers, 300-series element numbers, or 400-series element numbers, as the case may be, except to note differences and/or to emphasize certain features. Thus, for example, the aircraft 502 of the aircraft system 500 shall be understood to be identical to the aircraft 102 (FIGS. 1A-1D), except to any extent indicated.

The delivery system 504 may include a reactor 528 having a housing 529 and a liner 531 disposed in the housing 529 such that the liner 531 of the reactor 528 defines the chamber 530. In certain implementations, the liner 531 may be removable from the housing 529, such as may be useful for efficiently replacing a reactant 533 (e.g., aluminum) used as component in a reaction to form a lifting gas 509 and/or for recovering one or more reaction byproducts (e.g., gallium and/or indium in instances in which aluminum is treated with one or both of these materials) once the reactant 533 has been reacted with a fluid 535 from a fluid source 536 to form the lifting gas 509. For example, one or both of the inlet region 532 and the outlet region 534 may be disposed along the housing 529 such that the liner 531 may be separable from the housing 529 with little or no need to connect or disconnect components of the delivery system 504 from the reactor 528 as the liner 531 is placed into or removed from the housing 529. As a specific example, the housing 529 may include door 537 that may be opened to provide access to the liner 531 for removal from or placement into the housing 529 (e.g., while one or both of the inlet region 532 or the outlet region 534 remain connected to the housing 529). With the liner 531 disposed in the housing 529, the door 537 may be securely closed to facilitate insulating the liner 531 and/or providing a measure of safety to personnel in the vicinity of the reactor 528 while a reaction is taking place in the chamber 530. While the door 537 is shown as being along a side of the housing 529, it shall be appreciated that the door 537 may positioned anywhere along the housing 529 as may be suitable for facilitating access to the liner 531. Further, or instead, in some instances, the liner 531 may be flexible such that the liner 531 may be partially compressed to fit into and/or out of the door 537, such as may be useful for forming the reactor 528 within a particular size envelope.

In general, the liner 531 may be formed of any one or more of various different types of material suitable for withstanding conditions associated with the reaction in the chamber 530 without significantly reacting or otherwise degrading. Thus, in some cases, the liner 531 may be formed of one or more materials having stable properties over a wide range of conditions in the field. Additionally, or alternatively, the liner 531 may be formed of one or more materials that may be formed with a flexible form factor (e.g., in the form of a bag) such that multiple instances of the liner 531 may be efficiently carried and/or stored when not in use. Accordingly, as an example, the liner 531 may be formed of one or more polymers (e.g., rubber), which are light, stable over a wide range of conditions, and, in those instances in which it would be useful, may be formed with a flexible form factor.

While the liner 531 may be used within the housing 529, it shall be appreciated that the liner 531 may be used by itself in some instances. That is, for some applications (e.g., those in remote environments), the liner 531 may be used by itself without the housing 529, such as may be useful for reducing the overall weight of the aircraft system 500.

Referring now to FIG. 5B, the liner 531 may be attachable to the aircraft 502 by one or more tethers 539 connectable, for example, to an inflatable structure 506 of the aircraft 502. For example, when the reaction in the liner 531 is sufficiently completed to fill the inflatable structure 506 to sufficient buoyancy, the liner 531 may be attached to the aircraft 502 using the one or more tethers 539 such that the liner 531 and the reaction byproducts therein may be carried away from the launch site, as may be useful for removing traces of the launch site while reducing the amount of material that must be carried away by personnel at the launch site. As may be appreciated, the weight of the liner 531 and its contents may provide ballast to the aircraft 502. In certain instances, the aircraft 502 may jettison the liner 531 at some point during flight, as may be useful for disposing of the liner 531 and its contents away from the launch site without carrying the weight of the liner 531 and its contents throughout the entire flight.

While the liner 531 is shown as being attached to the aircraft 502 using tethers 539, it shall be appreciated that one or more other approaches to attaching the liner 531 to the aircraft 502 may additionally, or alternatively, be possible. For example, the liner 531 may be attached to the aircraft 502 using all or a portion of an exhaust 538 of the delivery system 504 such that the liner 531 and all or a portion of the exhaust 538 are carried away with the aircraft 502. This may be particularly useful, for example, in instances in which the liner 531 is used without the housing 529. Further, or instead, while a single instance of the liner 531 is shown as being attached to the aircraft 502 to be taken away, it shall be appreciated that a plurality of instances of the liner 531 may be attached to the aircraft 502 in some cases.

While certain implementations have been described, other implementations are additionally or alternatively possible.

Figure 6:
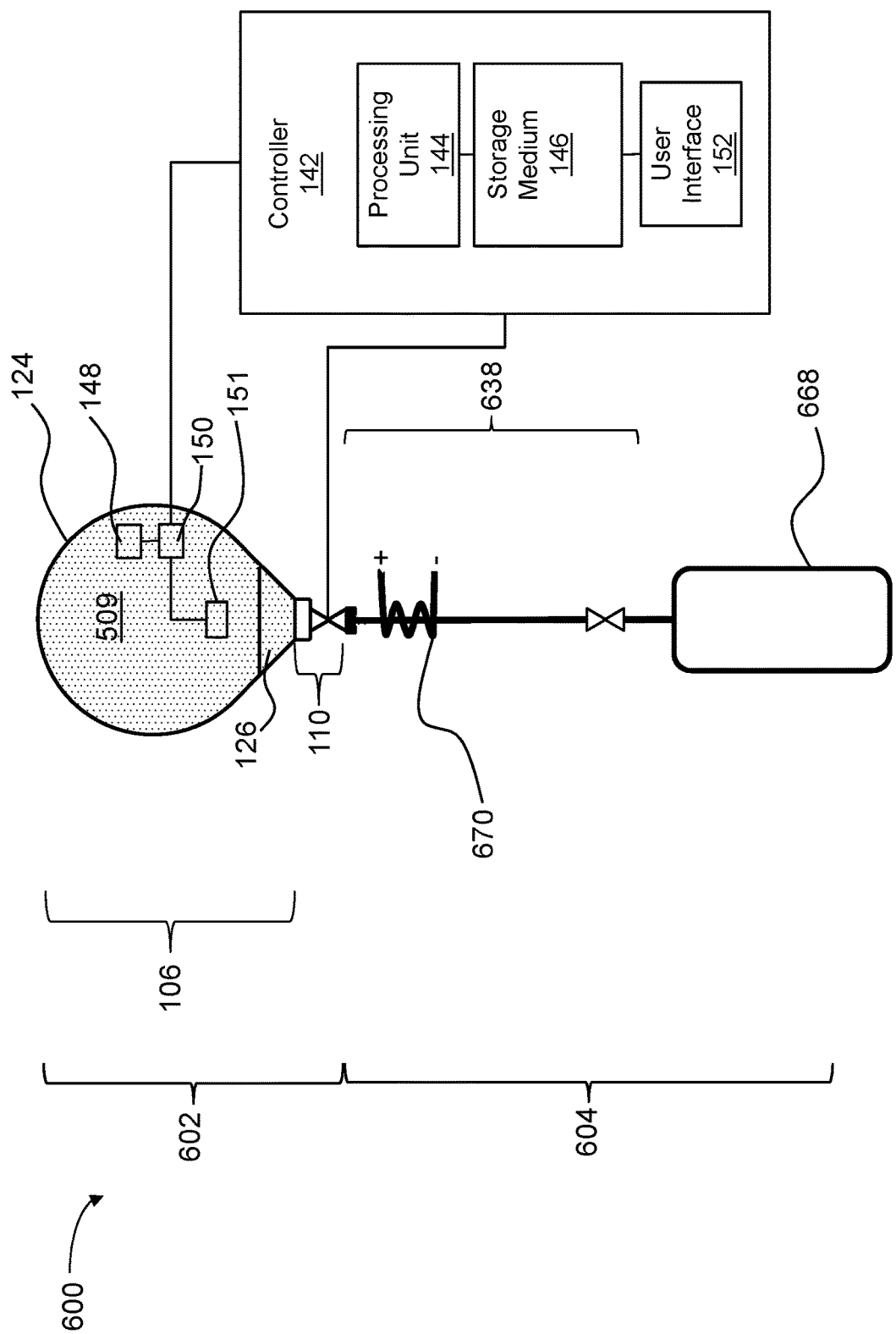
FIG. 6 is a schematic representation of an aircraft system including a delivery system having a compressed gas cylinder as a source of a lifting gas.

For example, while lifting gas has been described as being at least partially generated through a reaction carried out in a reactor, additional or alternative approaches to delivering a lifting are possible. As an example, referring now to FIG. 6, an aircraft system 600 may include an aircraft 602 and a delivery system 604. For the sake of clear and efficient description, elements of the aircraft system 600 shall be understood to be analogous to or interchangeable with elements of the aircraft system 100 corresponding to 100-series element numbers (e.g., in FIGS. 1A-1D), elements of the aircraft system 300 corresponding to 300-series element numbers (e.g., in FIG. 3), and/or elements of the aircraft system 400 corresponding to 400-series element numbers (e.g., in FIG. 4), unless otherwise explicitly made clear from the context and, therefore, are not described separately from counterpart 100-series element numbers, 300-series element numbers, or 400-series element numbers, as the case may be, except to note differences and/or to emphasize certain features. Thus, for example, the aircraft 602 of the aircraft system 600 shall be understood to be identical to the aircraft 102 (FIGS. 1A-1D), except to any extent indicated.

The delivery system 604 may include an exhaust 638, a compressed gas cylinder 668, and a heater 670 (e.g., an electric heater powered by a separate power source). The compressed gas cylinder 668 may include a lifting gas 609 having, for example, a known composition. Pressure in the compressed gas cylinder 668 may move the lifting gas 609 along the exhaust 638, in a direction toward the aircraft 602. The heater 670 may be in thermal communication with the exhaust 638, between the compressed gas cylinder 668 and the aircraft 602 to heat the lifting gas 609 as it moves past the heater 670. That is, as the lifting gas 609 moves past the heater 670 the lift capacity of the lifting gas 609 may increase. In certain implementations, the temperature of the lifting gas 609 may be tightly controlled such that, in combination with the known composition of the lifting gas 609 in the compressed gas cylinder 668, the lift capacity of the lifting gas 609 in the aircraft 602 may be known more accurately, as compared to techniques in which the temperature and/or composition of a lifting gas are not tightly controlled or are not controlled at all. Such precise knowledge of the lift capacity of the lifting as 509 may be useful, for example, in achieving precision in the flight path executed by the aircraft 602.

Figure 7:
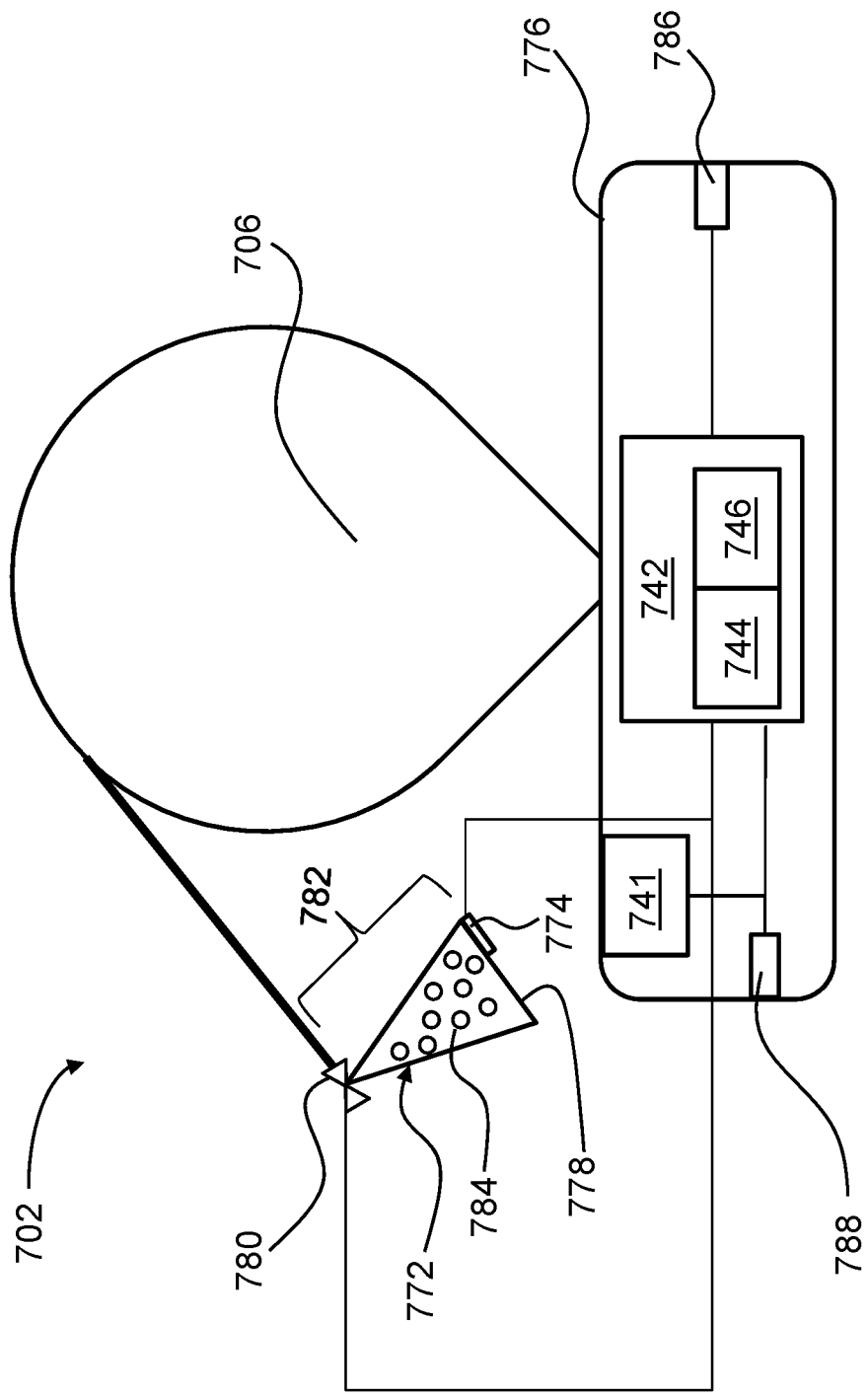
FIG. 7 is a schematic representation of an aircraft including a nozzle and igniter directed toward a payload of an inflatable structure.

As another example, while the use of lifting gas has been described with respect to providing lift to aircraft described herein, other uses of the lifting gas onboard of the aircraft are additionally or alternatively possible. For example, referring now to FIG. 7, an aircraft 702 may include an inflatable structure 706, a nozzle 772, an igniter 774, and a payload 776. For the sake of clear and efficient description, elements of the aircraft 702 shall be understood to be analogous to or interchangeable with elements of the aircraft 102 corresponding to 100-series element numbers (e.g., in FIGS. 1A-1D), elements of the aircraft 302 corresponding to 300-series element numbers (e.g., in FIG. 3), elements of the aircraft 402 corresponding to 400-series element numbers (e.g., in FIG. 4), and/or elements of the aircraft 602 corresponding to 500-series element numbers, unless otherwise explicitly made clear from the context and, therefore, are not described separately from counterpart 100-series element numbers, 300-series element numbers, 400-series element numbers, or 500-series element numbers, as the case may be, except to note differences and/or to emphasize certain features. Thus, for example, the aircraft 702 of the aircraft system 400 shall be understood to be identical to the aircraft 102 (FIGS. 1A-1D), except to any extent indicated. In particular, unless otherwise specified or made clear from the context, the inflatable structure 706 of the aircraft 702 shall be understood to define a volume analogous to the volume 108 defined by the inflatable structure 106 in FIGS. 1A-1D and, thus, while this volume is not described separately, it shall be understood to contain a lifting gas providing buoyancy to the aircraft 702 during flight.

In general, the nozzle 772 may be selectively actuatable in fluid communication with the volume defined by the inflatable structure 706 of the aircraft 702. The nozzle 772 may define an exit 778 such that lifting gas in the volume defined by the inflatable structure 706 may be delivered to the nozzle 772 and, via the exit 778 of the nozzle 772, directed toward the payload 776. To the extent the lifting gas carried in the volume defined by inflatable structure 706 is combustible (e.g., contains hydrogen or a mixture thereof) when mixed with ambient air or by itself, the lifting gas directed from the nozzle 772 toward the payload 776 may be ignited to destroy the payload 776. This may be useful, for example, for protecting sensitive information (e.g., proprietary instrumentation) from being discovered (e.g., by hostile entities) once the aircraft 702 descends to the ground upon completion of the mission. Thus, more generally, the ability to destroy the payload 776 using a lifting gas carried on the aircraft 702 may facilitate protecting sensitive technology and/or data without adding significantly to the overall weight of the aircraft 702 and, thus, without significantly impacting flight performance of the aircraft 702 under otherwise identical conditions.

In certain implementations, the nozzle 772 may include control valve 780 (e.g., a normally closed solenoid valve) positioned away from the exit 778, with the control valve 780 in electrical communication with the payload 776. In use, the payload 776 may send a signal to actuate the control valve 780 such that the nozzle 772 is selectively actuatable in fluid communication with lifting gas in the volume defined by the inflatable structure 706 through actuation of the control valve 780. That is, to the extent pressure of the lifting gas in the volume defined by the inflatable structure 706 exceeds atmospheric pressure outside of the inflatable structure 706, actuation of the control valve 780 in response to the signal from the payload 776 may allow some of the lifting gas to move from the volume into the nozzle 772, in a direction generally toward the exit 778 of the nozzle 772.

In certain implementations, the nozzle 772 may be coupled to any portion of the aircraft 702 suitable for orienting the exit 778 of the nozzle 772 toward the payload 776 while also being positioned such that the exit 778 is close to the payload 776 such that a flame extending from the exit 778 may reach the payload 776 as intended. For example, at least a portion of the payload 776 may be exposed to an environment outside of the volume defined by the inflatable structure 706 of the aircraft 702 such that the payload 776 may be ignited away from the volume containing the lifting gas. That is, with at least a portion of the payload 776 exposed to the environment outside of the volume, the aircraft 702 may be destroyed in stages—with the payload 776 igniting and burning for a period before the lifting gas in the volume is ignited. Such staged burning may be useful for increasing the likelihood of destroying the payload 776 before the aircraft 702 reaches the ground.

Given the conditions likely to be encountered by the aircraft 702 at altitude, the nozzle 772 may include a mixing section 782 between the control valve 780 and the exit 778 of the nozzle 772 and in fluid communication with at least the exit 778 of the nozzle 772. The mixing section 782 may define, for example, at least one orifice 784 through which air in the environment is movable into the mixing section 782 to mix with the lifting gas from the volume upon actuation of the control valve 780. The total open area of the at least one orifice 784 may be sized to achieve fuel/air ratios within the rich and lean ignition limits of the expected composition of the lifting gas in the volume and the oxygen concentration of air at a range of flight altitudes of the aircraft 702.

The igniter 774 may be disposed in the vicinity of the exit 778 of the nozzle 772. As used in this context, the proximity of the igniter 774 to the exit 778 of the nozzle 772 shall be understood to include positions just beyond the exit 778 of the nozzle 772 and, further or instead, may include positions within the nozzle 772 such that the nozzle 772 may protect the igniter 774 from damage while also facilitating ignition of an ignitable mixture in windy conditions that may be associated with flight of the aircraft 702 at high altitude. Thus, in some instances, the igniter 774 may be mechanically coupled to the nozzle 772. Further, or instead, the igniter 774 may be in electrical communication with the payload 776 such that one or more electrical signals generated by the payload 776 may ignite the igniter 774 while the control valve 780 of the nozzle 772 is open such that lifting gas is flowing toward the exit 778 of the nozzle 772. For example, the igniter 774 may be a spark ignitor, and the one or more electrical signals generated by the payload 776 may generate a spark that ignites an air/fuel mixture (e.g., an air/fuel mixture generated in the mixing section 782) moving past the igniter 774.

In general, the payload 776 may include a strategic portion 741 and a controller 742. The strategic portion 741 of the payload 776 may include any one or more of various different types of various different sensitive material collected by or otherwise received by the aircraft 702 as part of a mission being carried out by the aircraft 702 by itself or when deployed with multiple instances of the aircraft 702. Unless otherwise specified or made clear from the context, the controller 742 may be analogous to the controller 142 (FIG. 1A) described above and, thus, is not described separately except to note additional or alternative features. Thus, for example, the controller 742 may include a processing unit 744 and a computer-readable storage medium 746, which shall be understood to be analogous to the processing unit 144 and the computer-readable storage medium 146, respectively, described above with respect to FIG. 1A. In addition to, or as an alternative to, other instructions stored in the computer-readable storage medium 746 for controlling inflation and/or flight of the aircraft 702, the computer-readable storage medium 746 may have stored thereon instructions that, when executed by the processing unit 744, cause the processing unit 744 to perform operations including actuating the nozzle 772 (e.g., by sending an electrical signal to the control valve 780 in electrical communication with the payload 776) to issue the lifting gas from the exit 778 of the nozzle 772 in a direction toward at least the strategic portion 741 of the payload 776. That is, given the sensitivity of the strategic portion 741, the nozzle 772 may oriented toward the strategic portion 741 of the payload 776 to increase the likelihood of destroying the strategic portion 741 of the payload 776 using a flame from the nozzle 772. In certain instances, as the strategic portion 741 of the payload 776 is being destroyed, the controller 742 may continue to operate for a period, such as may be useful for facilitating continued flight of the aircraft 702. That is, by facilitating continued flight of the aircraft 702 as the strategic portion 741 of the payload 776 is being destroyed, there may be a reduced risk that destruction of the strategic portion 741 of the payload 776 may be prematurely interrupted, thus frustrating the corresponding attempt to destroy the strategic portion 741 of the payload 776. In certain instances, the strategic portion 741 of the payload 776 may be at least partially exposed to the environment outside of the aircraft 702 to facilitate destroying the strategic portion 741 of the payload 776 using a flame from the nozzle 772. Further or instead, the controller 742 may be computer-readable storage medium 746 may have stored, thereon instructions that, when executed by the processing unit 744, cause the processing unit 744 to send a signal to the igniter 774 in electrical communication with the payload 776 to ignite a combustible mixture including the lifting gas directed from the exit 778 of the nozzle 772 toward the payload 776 exposed to an environment outside of the volume, the inflatable structure 706, or a combination thereof.

In some implementations, the aircraft 702 may further include a sensor 786 in electrical communication with the controller 742. Continuing with this example, the computer-readable storage medium 746 of the controller 742 may further, or instead, have stored thereon computer readable instructions that, when executed by the processing unit 744, cause the processing unit 744 to receive a signal from the sensor 786 and to actuate at least one of the nozzle 772 (e.g., the control valve 780) or the igniter 774 based on the signal from the sensor 786. For example, the sensor 786 may be an altimeter such that the controller 742 may ignite the payload 776 based on any one or more of various conditions associated with altitude of the aircraft 702 (e.g., when the aircraft 702 descends to a predetermined altitude). Additionally, or alternatively, the sensor 786 may include one or more of thermocouple, a timer, or a global positioning system receiver. Further, or instead, the sensor 786 may include a wireless communication receiver such that the controller 742 may initiate destruction of the payload 776 based on a signal received from a remote source, such as an operator on the ground.

In some instances, the aircraft 702 may further include a transmitter 788 in electrical communication with the controller 742. In such instances, the computer-readable storage medium 746 of the controller 742 may further, or instead, have stored thereon computer readable instructions that, when executed by the processing unit 744, cause the processing unit 744 to activate the transmitter 788 (e.g., based on the signal from the sensor 786) to transmit data from the strategic portion 741 of the payload 776 prior to destruction of the strategic portion 741 of the payload 776. The transmitter 788 may be any one or more of various different transmitters suitable for carrying out a particular type of communication (e.g., encrypted communication). By way of example, and not limitation, the transmitter 788 may be a line of sight data transmitter. For example, the transmitter 788 may transmit data from the strategic portion 741 of the payload 776 to another instance of the aircraft 702 within line of sight of the instance of the aircraft 702 being destroyed. As may be appreciated from this example, a plurality of instances of the aircraft 702 may communicate sensitive information in this way to increase the likelihood that the sensitive information may be retrieved by an intended party while decreasing the likelihood that the sensitive information will be intercepted by an unintended party.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. An aircraft system comprising:
    an inflatable structure defining a volume configured to receive a lifting gas;
    a drain valve coupled to the inflatable structure and disposed relative to the volume to collect condensate, in the volume, from the lifting gas received into the volume, the drain valve controllable to expel the condensate from the volume while maintaining a substantially gas-tight seal between the volume and an environment outside of the volume;
    a reactor defining a chamber, an inlet region, and an outlet region, wherein the inlet region and the outlet region are in fluid communication with one another and with the chamber, the inlet region is releasably securable in fluid communication with a fluid source, and the lifting gas is receivable into the volume via fluid communication between the volume of the inflatable structure and the outlet region of the reactor; and
    a swirl separator arranged to substantially separate one heavier component from at least one lighter component in a flow of the lifting gas from the outlet region of the reactor and direct the remaining lifting gas from the swirl separator toward the volume of the inflatable structure.

2. The aircraft system of claim 1, wherein the inflatable structure includes a balloon substantially defining the volume, and the balloon is formed of one or more of a compliant material or a semi-compliant material.

3. The aircraft system of claim 1, wherein at least a portion of the reactor is mechanically securable to the inflatable structure to be movable with the inflatable structure during flight.

4. The aircraft system of claim 1, wherein the drain valve is substantially disposed within the volume of the inflatable structure.

5. The aircraft system of claim 1, wherein the drain valve is self-controllable to open and close based on a level of the condensate in the volume of the inflatable structure.

6. The aircraft system of claim 1, wherein the swirl separator includes a swirl vane separator.

7. The aircraft system of claim 1, further comprising an auxiliary gas source in fluid communication with the volume of the inflatable structure to mix an auxiliary gas from the auxiliary gas source with the lifting gas receivable into the volume from the outlet region of the reactor.

8. The aircraft system of claim 7, wherein a flow rate of the auxiliary gas from the auxiliary gas source is adjustable to control a ratio of the auxiliary gas to the lifting gas receivable into the volume of the inflatable structure.

9. The aircraft system of claim 1, wherein the drain valve is disposed relative to the volume of the inflatable structure in an orientation in which the condensate in the volume is movable toward the drain valve under gravitational force.

10. The aircraft system of claim 9, wherein the drain valve includes a float valve.

11. The aircraft system of claim 9, wherein the inflatable structure further includes a ballast section disposed relative to the drain valve in an orientation in which the condensate in the volume collects in the ballast section as the condensate moves toward the drain valve under gravitational force, and the drain valve is controllable to retain a predetermined amount of condensate in the ballast section to ballast the inflatable structure and expel an excess amount of condensate from the volume while maintaining the substantially gas-tight seal between the volume and the environment outside of the volume.

12. The aircraft system of claim 1, further comprising a condenser and a container in fluid communication with each other, wherein the container is in fluid communication with the chamber of the reactor, and the condenser is configured to return at least some fluid from the reactor to the container while the inflatable structure is in fluid communication with the outlet region of the reactor.

13. The aircraft system of claim 12, further comprising a first heat exchanger in thermal communication with the condenser.

14. The aircraft system of claim 12, further comprising a second heat exchanger in thermal communication with the chamber of the reactor.

* * * * *